(12) United States Patent
Baker et al.

(10) Patent No.: US 10,618,830 B2
(45) Date of Patent: Apr. 14, 2020

(54) SUBMERGED COMBUSTION BURNERS, SUBMERGED COMBUSTION GLASS MELTERS INCLUDING THE BURNERS, AND METHODS OF USE

(71) Applicant: JOHNS MANVILLE, Denver, CO (US)

(72) Inventors: John Wayne Baker, Golden, CO (US); Aaron Morgan Huber, Castle Rock, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 16/405,770

(22) Filed: May 7, 2019

(65) Prior Publication Data

US 2019/0263702 A1 Aug. 29, 2019

Related U.S. Application Data

(60) Continuation of application No. 16/203,266, filed on Nov. 28, 2018, which is a division of application No.
(Continued)

(51) Int. Cl.
*F23D 14/58* (2006.01)
*C03B 5/235* (2006.01)
(Continued)

(52) U.S. Cl.
CPC ............ *C03B 5/2356* (2013.01); *C03B 5/182* (2013.01); *C03B 5/2353* (2013.01); *F23C 3/004* (2013.01); *F23D 14/045* (2013.01); *F23D 14/22* (2013.01); *F23D 14/32* (2013.01); *F23D 14/48* (2013.01); *F23D 14/58* (2013.01); *F23D 14/70* (2013.01); *F23D 14/78* (2013.01); *C03B 2211/22* (2013.01); *C03B 2211/23* (2013.01); *C03B 2211/60* (2013.01); *F27D 2099/0036* (2013.01); *Y02P 40/55* (2015.11); *Y02P 40/58* (2015.11)

(58) Field of Classification Search
CPC . C03B 5/2356; C03B 5/2353; C03B 2211/23; C03B 2211/60; F23D 14/045; F23D 14/58
See application file for complete search history.

(56) References Cited

U.S. PATENT DOCUMENTS 1,706,857 A    3/1929    Mathe
2,174,533 A    10/1939    See et al.
(Continued)

FOREIGN PATENT DOCUMENTS

CA     2938594 A1 *   2/2017  ............. F23C 3/004
CN     202329916 U     7/2012
(Continued)

OTHER PUBLICATIONS

"Glass Technologies—The Legacy of a Successful Public-Private Partnership", 2007, U.S. Department of Energy, pp. 1-32.
(Continued)

*Primary Examiner* — Gregory A Wilson
(74) *Attorney, Agent, or Firm* — Robert D. Touslee

(57) ABSTRACT

Submerged combustion burners having improved fuel and oxidant mixing characteristics. Submerged combustion melters including the burners. Methods of using submerged combustion melters to melt glass-forming materials and produce molten glass.

29 Claims, 9 Drawing Sheets

Related U.S. Application Data

14/785,330, filed as application No. PCT/US2013/043398 on May 30, 2013, now Pat. No. 10,183,884.

(51) Int. Cl.

| | | |
|---|---|---|
| *F23C 3/00* | (2006.01) | |
| *F23D 14/22* | (2006.01) | |
| *F23D 14/32* | (2006.01) | |
| *F23D 14/48* | (2006.01) | |
| *F23D 14/70* | (2006.01) | |
| *F23D 14/78* | (2006.01) | |
| *C03B 5/182* | (2006.01) | |
| *F23D 14/04* | (2006.01) | |
| *F27D 99/00* | (2010.01) | |

(56) References Cited

U.S. PATENT DOCUMENTS

| | | | |
|---|---|---|---|
| 2,118,479 | A | 1/1940 | McCaskey |
| 2,269,459 | A | 1/1942 | Kleist |
| 2,321,480 | A | 6/1943 | Gaskell |
| 2,432,942 | A | 12/1947 | See et al. |
| 2,455,907 | A | 1/1948 | Slayter |
| 2,616,790 | A * | 11/1952 | Swindin .......... C01G 49/14 |
| | | | 126/360.2 |
| 2,679,749 | A | 6/1954 | Poole |
| 2,718,096 | A | 9/1955 | Henry et al. |
| 2,773,545 | A | 12/1956 | Petersen |
| 2,781,756 | A | 2/1957 | Kobe |
| 2,878,644 | A | 3/1959 | Fenn |
| 2,890,166 | A | 6/1959 | Heinze |
| 2,902,029 | A | 9/1959 | Hill |
| 2,981,250 | A | 4/1961 | Stewart |
| 3,020,165 | A | 2/1962 | Davis |
| 3,056,283 | A | 10/1962 | Tiede |
| 3,073,683 | A | 1/1963 | Switzer et al. |
| 3,084,392 | A | 4/1963 | Labino |
| 3,088,812 | A | 5/1963 | Bitterlich et al. |
| 3,104,947 | A | 9/1963 | Switzer et al. |
| 3,160,578 | A | 12/1964 | Saxton et al. |
| 3,165,452 | A | 1/1965 | Williams |
| 3,170,781 | A | 2/1965 | Keefer |
| 3,174,820 | A | 3/1965 | See et al. |
| 3,215,189 | A | 11/1965 | Bauer |
| 3,224,855 | A | 12/1965 | Plumat |
| 3,237,929 | A | 3/1966 | Plumat et al. |
| 3,241,548 | A | 3/1966 | See et al. |
| 3,248,205 | A | 4/1966 | Dolf et al. |
| 3,260,587 | A * | 7/1966 | Marceau .......... C03B 5/2356 |
| | | | 65/134.5 |
| 3,268,313 | A | 8/1966 | Burgman et al. |
| 3,285,834 | A | 11/1966 | Guerrieri et al. |
| 3,294,512 | A | 12/1966 | Penberthy |
| 3,325,298 | A | 6/1967 | Brown |
| 3,339,616 | A | 9/1967 | Ward, Jr. et al. |
| 3,347,660 | A | 10/1967 | Smith et al. |
| 3,385,686 | A | 5/1968 | Plumat et al. |
| 3,402,025 | A | 9/1968 | Garrett et al. |
| 3,407,805 | A | 10/1968 | Bougard |
| 3,407,862 | A | 10/1968 | Mustian, Jr. |
| 3,421,873 | A | 1/1969 | Burgman et al. |
| 3,432,399 | A | 3/1969 | Schutt |
| 3,445,214 | A | 5/1969 | Oremesher |
| 3,498,779 | A | 3/1970 | Hathaway |
| 3,510,393 | A | 5/1970 | Burgman et al. |
| 3,525,674 | A | 8/1970 | Barnebey |
| 3,533,770 | A | 10/1970 | Adler et al. |
| 3,563,683 | A | 2/1971 | Hess |
| 3,592,151 | A | 7/1971 | Webber |
| 3,592,623 | A | 7/1971 | Shepherd |
| 3,606,825 | A | 9/1971 | Johnson |
| 3,617,234 | A | 11/1971 | Hawkins et al. |
| 3,627,504 | A | 12/1971 | Johnson et al. |
| 3,692,017 | A | 9/1972 | Glachant et al. |
| 3,717,139 | A | 2/1973 | Guillet et al. |
| 3,738,792 | A * | 6/1973 | Feng .......... F23D 17/00 |
| | | | 431/158 |
| 3,746,527 | A | 7/1973 | Knavish et al. |
| 3,747,588 | A | 7/1973 | Malmin |
| 3,754,879 | A | 8/1973 | Phaneuf |
| 3,756,800 | A | 9/1973 | Phaneuf |
| 3,763,915 | A | 10/1973 | Perry et al. |
| 3,764,287 | A | 10/1973 | Brocious |
| 3,771,988 | A | 11/1973 | Starr |
| 3,775,039 | A | 11/1973 | Pillard |
| 3,818,893 | A | 6/1974 | Kataoka et al. |
| 3,835,909 | A | 9/1974 | Douglas et al. |
| 3,840,002 | A | 10/1974 | Douglas et al. |
| 3,856,496 | A | 12/1974 | Nesbitt et al. |
| 3,885,945 | A | 5/1975 | Rees et al. |
| 3,907,585 | A | 9/1975 | Francel et al. |
| 3,913,560 | A | 10/1975 | Lazarre et al. |
| 3,951,635 | A | 4/1976 | Rough |
| 3,976,464 | A | 8/1976 | Wardlaw |
| 4,001,001 | A | 1/1977 | Knavish et al. |
| 4,004,903 | A | 1/1977 | Daman et al. |
| 4,083,711 | A | 4/1978 | Jensen |
| 4,097,028 | A | 6/1978 | Langhammer |
| 4,110,098 | A | 8/1978 | Mattmuller |
| 4,153,438 | A | 5/1979 | Stream |
| 4,185,982 | A | 1/1980 | Schwenninger |
| 4,203,761 | A | 5/1980 | Rose |
| 4,205,966 | A | 6/1980 | Horikawa |
| 4,226,564 | A | 10/1980 | Takahashi et al. |
| 4,238,226 | A | 12/1980 | Sanzenbacher et al. |
| 4,249,927 | A | 2/1981 | Fakuzaki et al. |
| 4,270,740 | A | 6/1981 | Sanzenbacher et al. |
| 4,282,023 | A | 8/1981 | Hammel et al. |
| 4,303,435 | A | 12/1981 | Sleighter |
| 4,323,718 | A | 4/1982 | Buhring et al. |
| 4,349,376 | A | 9/1982 | Dunn et al. |
| 4,406,683 | A | 9/1983 | Demarest |
| 4,413,882 | A | 11/1983 | Bailey et al. |
| 4,488,537 | A | 12/1984 | Laurent |
| 4,539,034 | A | 9/1985 | Hanneken |
| 4,542,106 | A | 9/1985 | Sproull |
| 4,545,800 | A | 10/1985 | Won et al. |
| 4,622,007 | A | 11/1986 | Gitman |
| 4,626,199 | A | 12/1986 | Bounini |
| 4,632,687 | A | 12/1986 | Kunkle et al. |
| 4,634,461 | A | 1/1987 | Demarest, Jr. et al. |
| 4,657,586 | A | 4/1987 | Masterson et al. |
| 4,735,642 | A | 4/1988 | Jensen et al. |
| 4,738,938 | A | 4/1988 | Kunkle et al. |
| 4,758,259 | A | 7/1988 | Jensen |
| 4,798,616 | A | 1/1989 | Knavish et al. |
| 4,814,387 | A | 3/1989 | Donat |
| 4,816,056 | A | 3/1989 | Tsai et al. |
| 4,877,436 | A | 10/1989 | Sheinkop |
| 4,877,449 | A | 10/1989 | Khinkis |
| 4,878,829 | A | 11/1989 | Anderson |
| 4,882,736 | A | 11/1989 | Pieper |
| 4,919,700 | A | 4/1990 | Pecoraro et al. |
| 4,927,886 | A | 5/1990 | Backderf et al. |
| 4,953,376 | A | 9/1990 | Merlone |
| 5,032,230 | A | 7/1991 | Shepherd |
| 5,052,874 | A | 10/1991 | Johanson |
| 5,062,789 | A | 11/1991 | Gitman |
| 5,097,802 | A | 3/1992 | Clawson |
| 5,168,109 | A | 12/1992 | Backderf et al. |
| 5,169,424 | A | 12/1992 | Grinnen et al. |
| 5,199,866 | A | 4/1993 | Joshi et al. |
| 5,204,082 | A | 4/1993 | Schendel |
| 5,261,602 | A | 11/1993 | Brent et al. |
| 5,299,929 | A | 4/1994 | Yap |
| 5,360,171 | A | 11/1994 | Yap |
| 5,374,595 | A | 12/1994 | Dumbaugh et al. |
| 5,405,082 | A | 4/1995 | Brown et al. |
| 5,449,286 | A | 9/1995 | Snyder et al. |
| 5,483,548 | A | 1/1996 | Coble |
| 5,490,775 | A | 2/1996 | Joshi et al. |
| 5,522,721 | A | 6/1996 | Drogue et al. |
| 5,545,031 | A | 8/1996 | Joshi et al. |

(56) References Cited

U.S. PATENT DOCUMENTS

| | | | |
|---|---|---|---|
| 5,575,637 A | 11/1996 | Slavejkov et al. |
| 5,595,703 A | 1/1997 | Swaelens et al. |
| 5,606,965 A | 3/1997 | Panz et al. |
| 5,613,994 A | 3/1997 | Muniz et al. |
| 5,615,668 A | 4/1997 | Panz et al. |
| 5,636,623 A | 6/1997 | Panz et al. |
| 5,672,827 A | 9/1997 | Jursich |
| 5,713,668 A | 2/1998 | Lunghofer et al. |
| 5,718,741 A | 2/1998 | Hull et al. |
| 5,736,476 A | 4/1998 | Warzke et al. |
| 5,743,723 A | 4/1998 | Iatrides et al. |
| 5,765,964 A | 6/1998 | Calcote et al. |
| 5,785,721 A | 7/1998 | Brooker |
| 5,814,121 A | 9/1998 | Travis |
| 5,829,962 A | 11/1998 | Drasek et al. |
| 5,833,447 A | 11/1998 | Bodelin et al. |
| 5,849,058 A | 12/1998 | Takeshita et al. |
| 5,863,195 A | 1/1999 | Feldermann |
| 5,944,507 A | 8/1999 | Feldermann |
| 5,944,864 A | 8/1999 | Hull et al. |
| 5,954,498 A | 9/1999 | Joshi et al. |
| 5,975,886 A | 11/1999 | Phillippe |
| 5,979,191 A | 11/1999 | Jian |
| 5,984,667 A | 11/1999 | Phillippe et al. |
| 5,993,203 A | 11/1999 | Koppang |
| 6,029,910 A | 2/2000 | Joshi et al. |
| 6,036,480 A | 3/2000 | Hughes et al. |
| 6,039,787 A | 3/2000 | Edlinger |
| 6,045,353 A | 4/2000 | VonDrasek et al. |
| 6,068,468 A | 5/2000 | Phillipe et al. |
| 6,071,116 A | 6/2000 | Phillipe et al. |
| 6,074,197 A | 6/2000 | Phillippe |
| 6,077,072 A | 6/2000 | Marin et al. |
| 6,085,551 A | 7/2000 | Pieper et al. |
| 6,109,062 A | 8/2000 | Richards |
| 6,113,389 A | 9/2000 | Joshi et al. |
| 6,116,896 A | 9/2000 | Joshi et al. |
| 6,120,889 A | 9/2000 | Turner et al. |
| 6,123,542 A | 9/2000 | Joshi et al. |
| 6,126,438 A | 10/2000 | Joshi et al. |
| 6,154,481 A | 11/2000 | Sorg et al. |
| 6,156,285 A | 12/2000 | Adams et al. |
| 6,171,100 B1 | 1/2001 | Joshi et al. |
| 6,183,848 B1 | 2/2001 | Turner et al. |
| 6,210,151 B1 | 4/2001 | Joshi et al. |
| 6,210,703 B1 | 4/2001 | Novich |
| 6,237,369 B1 | 5/2001 | LeBlanc et al. |
| 6,241,514 B1 | 6/2001 | Joshi et al. |
| 6,244,197 B1 | 6/2001 | Coble |
| 6,244,857 B1 | 6/2001 | VonDrasek et al. |
| 6,247,315 B1 | 6/2001 | Marin et al. |
| 6,250,136 B1 | 6/2001 | Igreja |
| 6,250,916 B1 | 6/2001 | Phillipe et al. |
| 6,274,164 B1 | 8/2001 | Novich |
| 6,276,924 B1 | 8/2001 | Joshi et al. |
| 6,276,928 B1 | 8/2001 | Joshi et al. |
| 6,293,277 B1 | 9/2001 | Panz et al. |
| 6,314,760 B1 | 11/2001 | Chenoweth |
| 6,314,896 B1 | 11/2001 | Marin et al. |
| 6,338,337 B1 | 1/2002 | Panz et al. |
| 6,344,747 B1 | 2/2002 | Lunghofer et al. |
| 6,357,264 B1 | 3/2002 | Richards |
| 6,386,271 B1 | 5/2002 | Kawamoto et al. |
| 6,418,755 B2 | 7/2002 | Chenoweth |
| 6,422,041 B1 | 7/2002 | Simpson et al. |
| 6,454,562 B1 | 9/2002 | Joshi et al. |
| 6,460,376 B1 | 10/2002 | Jeanvoine et al. |
| 6,536,651 B2 | 3/2003 | Ezumi et al. |
| 6,558,606 B1 | 5/2003 | Kulkarni et al. |
| 6,660,106 B1 | 12/2003 | Babel et al. |
| 6,694,791 B1 | 2/2004 | Johnson et al. |
| 6,701,617 B2 | 3/2004 | Li et al. |
| 6,705,118 B2 | 3/2004 | Simpson et al. |
| 6,708,527 B1 | 3/2004 | Ibarlucea et al. |
| 6,711,942 B2 | 3/2004 | Getman et al. |
| 6,715,319 B2 | 4/2004 | Barrow et al. |
| 6,722,161 B2 | 4/2004 | LeBlanc |
| 6,736,129 B1 | 5/2004 | Sjith |
| 6,739,152 B2 | 5/2004 | Jeanvoine et al. |
| 6,796,147 B2 | 9/2004 | Borysowicz et al. |
| 6,797,351 B2 | 9/2004 | Kulkarni et al. |
| 6,854,290 B2 | 2/2005 | Hayes et al. |
| 6,857,999 B2 | 2/2005 | Jeanvoine |
| 6,883,349 B1 | 4/2005 | Jeanvoine |
| 6,918,256 B2 | 7/2005 | Gutmark et al. |
| 7,027,467 B2 | 4/2006 | Baev et al. |
| 7,116,888 B1 | 10/2006 | Aitken et al. |
| 7,134,300 B2 | 11/2006 | Hayes et al. |
| 7,168,395 B2 | 1/2007 | Engdahl |
| 7,175,423 B1 | 2/2007 | Pisano et al. |
| 7,231,788 B2 | 6/2007 | Karetta et al. |
| 7,273,583 B2 | 9/2007 | Rue et al. |
| 7,383,698 B2 | 6/2008 | Ichinose et al. |
| 7,392,668 B2 | 7/2008 | Adams et al. |
| 7,428,827 B2 | 9/2008 | Maugendre et al. |
| 7,441,686 B2 | 10/2008 | Odajima et al. |
| 7,448,231 B2 | 11/2008 | Jeanvoine et al. |
| 7,454,925 B2 | 11/2008 | DeAngelis et al. |
| 7,509,819 B2 | 3/2009 | Baker et al. |
| 7,565,819 B2 | 7/2009 | Jeanvoine et al. |
| 7,578,988 B2 | 8/2009 | Jacques et al. |
| 7,581,948 B2 | 9/2009 | Borders et al. |
| 7,622,677 B2 | 11/2009 | Barberree et al. |
| 7,624,595 B2 | 12/2009 | Jeanvoine et al. |
| 7,748,592 B2 | 7/2010 | Koga et al. |
| 7,767,606 B2 | 8/2010 | McGinnis et al. |
| 7,778,290 B2 | 8/2010 | Sacks et al. |
| 7,781,562 B2 | 8/2010 | Crawford et al. |
| 7,802,452 B2 | 9/2010 | Borders et al. |
| 7,832,365 B2 | 11/2010 | Hannum et al. |
| 7,845,314 B2 | 12/2010 | Smith |
| 7,855,267 B2 | 12/2010 | Crawford et al. |
| 8,033,254 B2 | 10/2011 | Hannum et al. |
| 8,279,899 B2 | 10/2012 | Kitabayashi |
| 8,285,411 B2 | 10/2012 | Hull et al. |
| 8,707,739 B2 | 4/2014 | Huber et al. |
| 8,875,544 B2 * | 11/2014 | Charbonneau ......... F23D 14/64 431/284 |
| 9,021,838 B2 * | 5/2015 | Charbonneau ......... C03B 5/202 65/347 |
| 9,032,760 B2 * | 5/2015 | Charbonneau ........ C03B 37/022 65/380 |
| 9,096,453 B2 | 8/2015 | Charbonneau |
| 9,587,825 B2 * | 3/2017 | Lefrere .................... C03B 5/44 |
| 9,643,871 B2 * | 5/2017 | Cowles ................ C03B 5/2356 |
| 9,777,922 B2 | 10/2017 | Hegde et al. |
| 10,011,510 B2 * | 7/2018 | Demott ..................... C03B 5/12 |
| 10,138,151 B2 * | 11/2018 | Cai ....................... C03B 5/1672 |
| 10,233,105 B2 * | 3/2019 | Faulkinbury ......... C03B 5/2356 |
| 2002/0086077 A1 | 7/2002 | Noller et al. |
| 2002/0134112 A1 | 9/2002 | Barrow et al. |
| 2002/0152770 A1 | 10/2002 | Becher et al. |
| 2002/0162358 A1 | 11/2002 | Jeanvoine et al. |
| 2002/0166343 A1 | 11/2002 | LeBlanc |
| 2003/0015000 A1 | 1/2003 | Hayes et al. |
| 2003/0029197 A1 | 2/2003 | Jeanvoine et al. |
| 2003/0037571 A1 | 2/2003 | Kobayashi et al. |
| 2003/0075843 A1 | 4/2003 | Wunsche |
| 2004/0131988 A1 | 7/2004 | Baker et al. |
| 2004/0168474 A1 | 9/2004 | Jeanvoine et al. |
| 2004/0224833 A1 | 11/2004 | Jeanvoine et al. |
| 2005/0026099 A1 | 2/2005 | Masi et al. |
| 2005/0039491 A1 | 2/2005 | Maugendre et al. |
| 2005/0083989 A1 | 4/2005 | Leister et al. |
| 2005/0103323 A1 | 5/2005 | Engdal |
| 2005/0236747 A1 | 10/2005 | Rue et al. |
| 2006/0000239 A1 | 1/2006 | Jeanvoine et al. |
| 2006/0174655 A1 | 8/2006 | Kobayashi et al. |
| 2006/0233512 A1 | 10/2006 | Aitken et al. |
| 2006/0257097 A1 | 11/2006 | Aitken et al. |
| 2006/0287482 A1 | 12/2006 | Crawford et al. |
| 2006/0293494 A1 | 12/2006 | Crawford et al. |
| 2006/0293495 A1 | 12/2006 | Crawford et al. |
| 2007/0106054 A1 | 5/2007 | Crawford et al. |

(56) References Cited

U.S. PATENT DOCUMENTS

| | | |
|---|---|---|
| 2007/0122332 A1 | 5/2007 | Jacques et al. |
| 2007/0130994 A1 | 6/2007 | Boratav et al. |
| 2007/0212546 A1 | 9/2007 | Jeanvoine et al. |
| 2007/0220922 A1 | 9/2007 | Bauer et al. |
| 2007/0246869 A1 | 10/2007 | Rymarchyk et al. |
| 2008/0035078 A1 | 2/2008 | Li |
| 2008/0227615 A1 | 9/2008 | McGinnis et al. |
| 2008/0256981 A1 | 10/2008 | Jacques et al. |
| 2008/0276652 A1 | 11/2008 | Bauer et al. |
| 2008/0293857 A1 | 11/2008 | Crawford et al. |
| 2009/0042709 A1 | 2/2009 | Jeanvoine et al. |
| 2009/0061370 A1 | 3/2009 | Douglas |
| 2009/0220899 A1 | 9/2009 | Spangelo et al. |
| 2010/0064732 A1 | 3/2010 | Jeanvoine et al. |
| 2010/0087574 A1 | 4/2010 | Crawford et al. |
| 2010/0089383 A1 | 4/2010 | Cowles |
| 2010/0120979 A1 | 5/2010 | Crawford et al. |
| 2010/0143601 A1 | 6/2010 | Hawtof et al. |
| 2010/0227971 A1 | 9/2010 | Crawford et al. |
| 2010/0236323 A1 | 9/2010 | D'Angelico et al. |
| 2010/0300153 A1 | 12/2010 | Zhang et al. |
| 2010/0304314 A1 | 12/2010 | Rouchy et al. |
| 2010/0307196 A1 | 12/2010 | Richardson |
| 2010/0326137 A1 | 12/2010 | Rouchy et al. |
| 2011/0054091 A1 | 3/2011 | Crawford et al. |
| 2011/0061642 A1 | 3/2011 | Rouchy et al. |
| 2011/0088432 A1 | 4/2011 | Pumode et al. |
| 2011/0107670 A1 | 5/2011 | Galley et al. |
| 2011/0236846 A1 | 9/2011 | Rue et al. |
| 2011/0308280 A1 | 12/2011 | Huber |
| 2012/0077135 A1 | 3/2012 | Charbonneau |
| 2012/0132725 A1 | 5/2012 | Dinu |
| 2012/0122490 A1 | 9/2012 | Cole et al. |
| 2013/0086944 A1 | 4/2013 | Shock et al. |
| 2013/0086949 A1 | 4/2013 | Charbonneau |
| 2013/0086950 A1 | 4/2013 | Huber et al. |
| 2013/0086951 A1 | 4/2013 | Charbonneau et al. |
| 2013/0086952 A1 | 4/2013 | Charbonneau et al. |
| 2013/0137051 A1 | 5/2013 | Beyer et al. |
| 2013/0283861 A1 | 10/2013 | Mobley et al. |
| 2017/0059153 A1* | 3/2017 | Baker .................. B23H 1/00 |
| 2017/0074506 A1* | 3/2017 | Huber .................. C03B 5/2356 |
| 2018/0044214 A1* | 2/2018 | Huber .................. C03B 5/2356 |

FOREIGN PATENT DOCUMENTS

| | | |
|---|---|---|
| DE | 37 10 244 A1 | 6/1989 |
| DE | 196 19 919 A1 | 8/1997 |
| DE | 100 29 983 C2 | 9/2003 |
| DE | 103 27 201 A1 | 1/2005 |
| DE | 10 2005 033330 B3 | 8/2006 |
| DE | 10 2008 006572 A1 | 7/2009 |
| EP | 0 181 248 B1 | 10/1989 |
| EP | 1 337 789 B1 | 12/2004 |
| EP | 1 990 321 A1 | 11/2008 |
| EP | 2 133 315 A1 | 12/2009 |
| EP | 1 986 966 B1 | 4/2010 |
| EP | 1 667 934 B1 | 2/2011 |
| FR | 2 740 860 A1 | 9/1997 |
| GB | 191301772 | 1/1914 |
| GB | 191407633 | 3/1914 |
| GB | 164073 A | 5/1921 |
| IT | 1208172 | 7/1989 |
| JP | S58 199728 A | 11/1983 |
| JP | S61 9901 7 A | 5/1986 |
| RO | 114827 | 7/1999 |
| WO | 1998055411 A1 | 12/1998 |
| WO | 2008103291 A1 | 8/2008 |
| WO | 2009091558 A1 | 7/2009 |
| WO | 2010011701 A2 | 1/2010 |
| WO | 2010045196 A3 | 4/2010 |
| WO | 2010147188 A1 | 12/2010 |

OTHER PUBLICATIONS

"Glass Melting Technology—A Technical and Economic Assessment," 2004, U.S. Department of Energy, pp. 1-292.

Rue, "Energy-Efficient Glass Melting—The Next Generation Melter", Gas Technology Institute, Project No. 20621 Final Report (2008).

"Glass Industry of the Future", United States Department of Energy, report 02-GA50113-03, pp. 1-17, Sep. 30, 2008.

Furman, BJ, ME 120 Experimental Methods Vibration Measurement, San Jose University Department of Mechanical and Aerospace Engineering.

Higley, BA, Glass Melter System Technologies for Vitrification of High-Sodium Content Low-Level, Radioactive, Liquid Wastes—Phase I: SBS Demonstration With Simulated Low-Level Waste—Final Test Report, Westinghouse Hanford Company.

Report for Treating Hanford LAW and WTP SW Simulants: Pilot Plant Mineralizing Flowsheet Apr. 2009, Department of Energy Environmental Management Consolidated Business Center by THOR Treatment Technologies, LLC.

Olabin, V.M. et al, "Submerged Combustion Furnace for Glass Melts," Ceramic Engineering and Science Proceedings, Jan. 1, 1996, pp. 84-92, vol. 17—No. 2, American Ceramic Society Inc., US.

\* cited by examiner

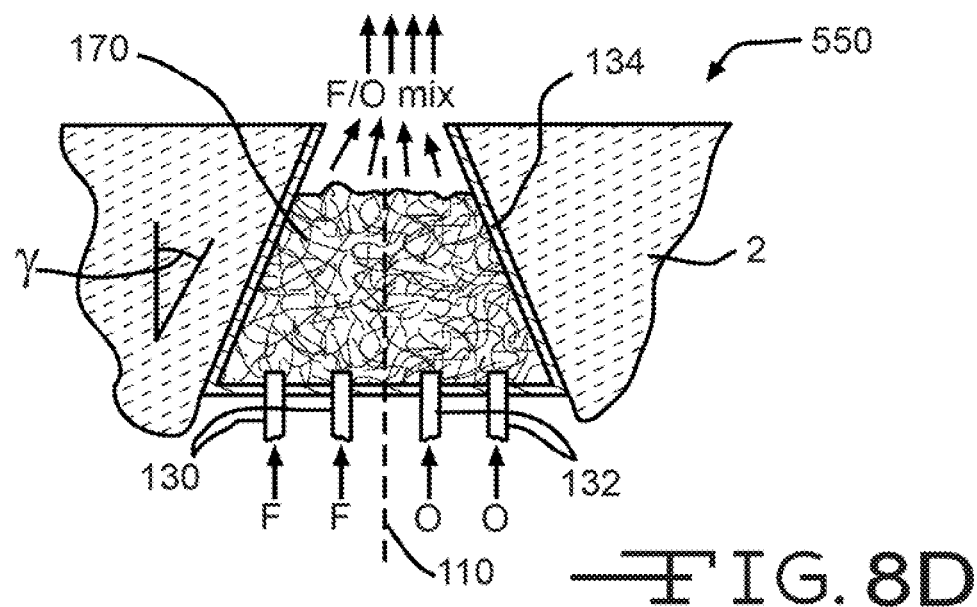
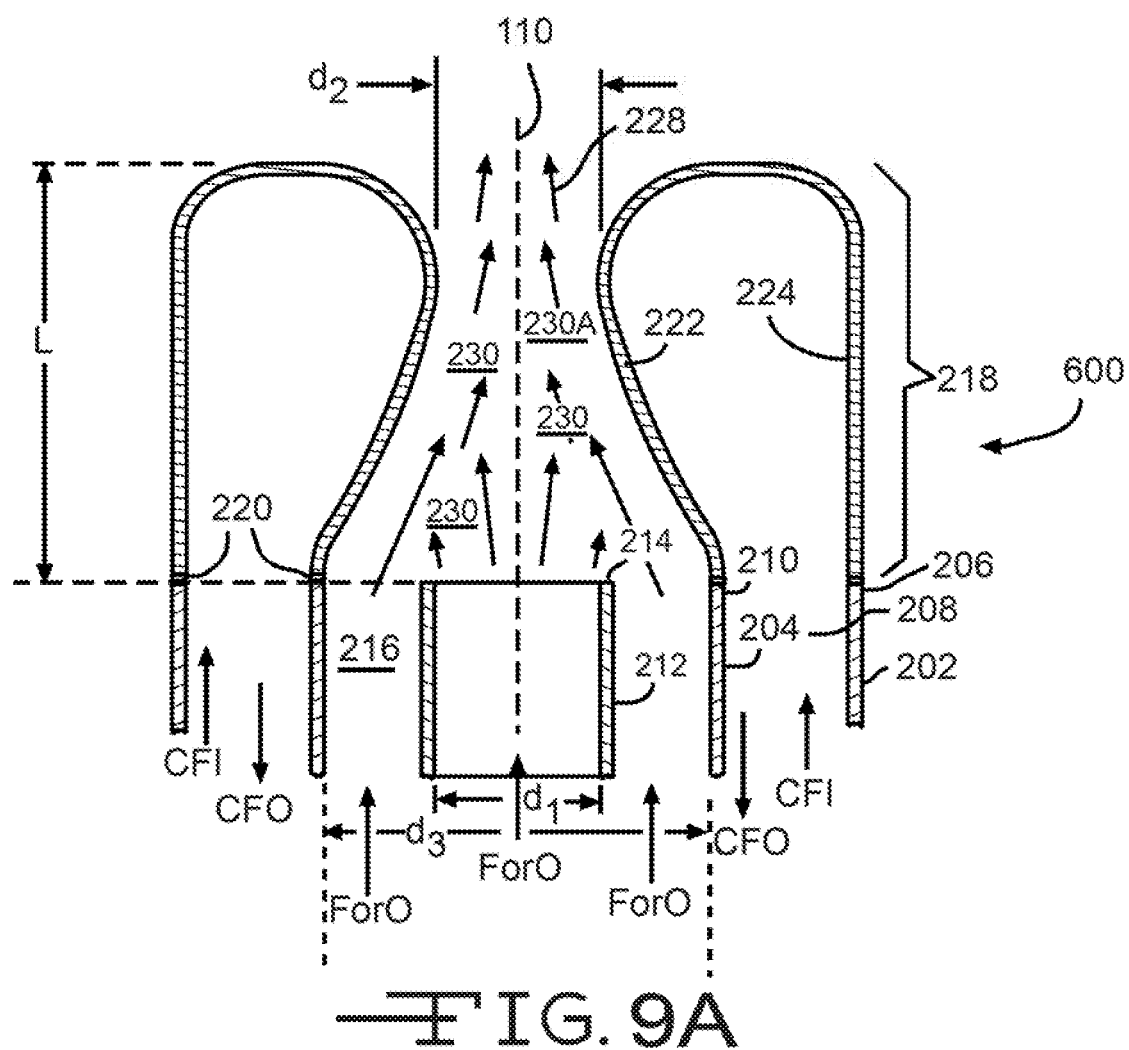

```
┌─────────────────────────────────────────────────────────────────────────┐  ╱─ 900
│ Melting glass-forming materials in a submerged combustion melter, the   │ ╱
│ melter comprising a floor, a roof, and a wall structure connecting the  │╱
│ floor and roof, one or more of the floor, roof, and wall structure      │──── 902
│ comprising fluid-cooled refractory material and an optional metallic    │
│ external shell, the fluid-cooled refractory material comprising one or  │
│ more coolant passages.                                                  │
└─────────────────────────────────────────────────────────────────────────┘
                                     │
                                     ▼
┌─────────────────────────────────────────────────────────────────────────┐
│ Combusting a fuel in one or more submerged combustion burners mounted   │──── 904
│ in the floor, roof, and/or wall structure, the submerged combustion     │
│ burners discharging combustion products under a level of the glass-     │
│ forming material having melted in the melter and creating turbulent     │
│ conditions in substantially all of the material, wherein at least one   │
│ of the submerged combustion burners is selected from the group          │
│ consisting of:                                                          │
└─────────────────────────────────────────────────────────────────────────┘
```

A) a burner comprising:
    an inner conduit having inlet and exit ends; and
    an outer conduit having inlet and outlet ends substantially juxtaposed to the inlet and exit ends of the inner conduit, with the proviso that the outer conduit exit end extends beyond the exit end of the inner conduit by a length sufficient to create a fuel and oxidant mixing region downstream of the inner conduit exit end, the outer conduit substantially concentric with the inner conduit;
        wherein at least one of the following conditions exist:
            i) at least one of the inner and outer conduit exit ends comprises a non-circular circumferential shape sufficient to increase the interfacial surface area between the fuel and the oxidant as they meet in the mixing region, wherein the increase is relative to circular cylindrical inner and outer conduits;
            ii) the inner conduit comprises one or more through-holes positioned within about three inner conduit diameters from the exit end of the inner conduit configured to provide intermixing of at least some fuel and oxidant within the inner conduit; and
            iii) the burner comprises at least one obstruction in the mixing region sufficient to increase mixing between the fuel and the oxidant in the mixing region upstream of a point of combustion of the fuel and oxidant, wherein the increase is relative to a similar burner without such obstruction;

B) a burner comprising:
    at least one oxidant supply conduit;
    at least one fuel supply conduit;
    a hollow body defining a fuel and oxidant mixing chamber, the fuel and oxidant conduits connected to corresponding inlet ports of the hollow body, the inlet ports configured to direct fuel and oxidant into the mixing chamber and create a fuel/oxidant mixture that exits the burner body through at least one fuel/oxidant mixture outlet port; wherein the hollow body, inlet ports, and outlet ports are configured to provide the fuel and oxidant sufficient proximity, mixing distance and/or pathways to create turbulent mixing of the fuel and oxidant prior to the mixture exiting the burner and combusting; and

FIG. 11

SUBMERGED COMBUSTION BURNERS, SUBMERGED COMBUSTION GLASS MELTERS INCLUDING THE BURNERS, AND METHODS OF USE

CROSS-REFERENCE TO RELATED APPLICATIONS

This application is a continuation of U.S. application Ser. No. 16/203,266 filed Nov. 28, 2018, which is a division of pending U.S. application Ser. No. 14/785,330 filed Oct. 17, 2015. The entire contents of the above-identified applications are herein incorporated by reference for all purposes.

BACKGROUND INFORMATION

Technical Field

The present disclosure relates generally to the field of combustion burners and methods of use, and more specifically to burners, submerged combustion glass melters, and methods of their use, particularly for melting glass forming materials.

Background Art

A submerged combustion melter (SCM) may be employed to melt glass batch and/or waste glass materials to produce molten glass by passing oxygen, oxygen-enriched mixtures, or air along with a liquid, gaseous and/or particulate fuel (some of which may be in the glass-forming materials), directly into a molten pool of glass, usually through burners submerged in a glass melt pool. The introduction of high flow rates of products of combustion of the oxidant and fuel into the molten glass, and the expansion of the gases during submerged combustion (SC), cause rapid melting of the glass batch and much turbulence and foaming.

In the context of SCMs, known oxy-fuel burners are predominately fluid-cooled or non-fluid-cooled nozzle mix designs and avoid premixing of fuel and oxidant for safety reasons due to the increased reactivity of using oxygen as the oxidant versus air. While these designs have largely proved adequate, there remains a desire for improved fuel combustion to maximize heat release from the fuel, and possibly reduce non-waste fuel and oxygen-enriched oxidant usage, as both non-waste fuel and oxygen-enriched oxidants typically require the expenditure of funds above that when the fuel is entirely waste material and the oxidant is air.

One currently used submerged combustion burner employs a smooth exterior surface, half-toroid, water-cooled steel burner tip or nozzle in which fuel, oxidant, and ultimately a fuel/oxidant mixture ideally pass through a generally central passage of the half-toroid and then combust upon exiting. When in use, however, some of the molten and/or still solid material can enter the central passage, particularly in floor-mounted burners, coating or partially coating the interior walls of the nozzle. This may lead to restricting flow of one or more of the fuel, oxidant, and fuel/oxidant mixture, and may in extreme cases lead to partial or full plugging of the nozzle, resulting in decreased or ultimately zero heat release to the molten material and/or material being melted through that particular burner.

Development of submerged combustion burners having improved heat release and/or less susceptibility to backflow of molten material and plugging while melting glass-forming materials would be an advance in the submerged combustion art.

SUMMARY

In accordance with the present disclosure, submerged combustion (SC) burners, melters including at least one of the submerged combustion burners, and methods of using the melters to produce molten glass are described that may reduce or eliminate problems with known SC burners, melters, and methods.

A first burner of the disclosure is a combustion burner comprising:
  an inner conduit having inlet and exit ends; and
  an outer conduit having inlet and outlet ends substantially juxtaposed to the inlet and exit ends of the inner conduit, with the proviso that the outer conduit exit end extends beyond the exit end of the inner conduit by a length sufficient to create a fuel and oxidant mixing region downstream of the inner conduit exit end, the outer conduit substantially concentric with the inner conduit;
  wherein at least one of the inner and outer conduit exit ends comprises a non-circular circumferential shape sufficient to increase the interfacial surface area of contact between the fuel and the oxidant as they meet in the mixing region, wherein the increase is relative to circular cylindrical inner and outer conduits.

A second burner of the disclosure is a combustion burner comprising:
  an inner conduit having inlet and exit ends; and
  an outer conduit having inlet and outlet ends substantially juxtaposed to the inlet and exit ends of the inner conduit, with the proviso that the outer conduit exit end extends beyond the exit end of the inner conduit by a length sufficient to create a fuel and oxidant mixing region downstream of the inner conduit exit end, the outer conduit substantially concentric with the inner conduit;
  wherein the inner conduit comprises one or more throughholes positioned within about three inner conduit diameters from the exit end of the inner conduit configured to provide intermixing of at least some fuel and oxidant within the inner conduit.

A third burner of the disclosure is a combustion burner, comprising:
  an inner conduit having inlet and exit ends; and
  an outer conduit having inlet and outlet ends substantially juxtaposed to the inlet and exit ends of the inner conduit, with the proviso that the outer conduit exit end extends beyond the exit end of the inner conduit by a length sufficient to create a fuel and oxidant mixing region downstream of the inner conduit exit end, the outer conduit substantially concentric with the inner conduit;
  wherein the burner comprises at least one partial obstruction in the mixing region sufficient to increase mixing between the fuel and the oxidant in the mixing region upstream of a point of combustion of the fuel and oxidant, wherein the increase is relative to a similar burner without such obstruction.

A fourth burner of the disclosure is a combustion burner comprising:
  at least one oxidant supply conduit;
  at least one fuel supply conduit;
  a hollow body defining a fuel and oxidant mixing chamber, the fuel and oxidant conduits connected to corresponding inlet ports of the hollow body, the conduits and inlet ports configured to direct fuel and oxidant into the mixing chamber and create a fuel/oxidant mixture that exits the burner body through at least one fuel/oxidant mixture outlet port;

wherein the hollow body, conduits, inlet ports, and outlet ports are configured to provide the fuel and oxidant sufficient proximity, mixing distance and/or pathways to create turbulent mixing of the fuel and oxidant prior to the mixture exiting the burner and combusting.

A fifth burner of the disclosure is a combustion burner comprising:

a burner body comprising an external conduit and a first internal conduit substantially concentric with the external conduit, the external conduit comprising a first end, a second end, and a longitudinal bore having a longitudinal axis, the first internal conduit comprising a first end, a second end, and a longitudinal bore having a longitudinal axis, the external conduit and first internal conduit forming a first annulus for passing a cooling fluid there between, and a second internal conduit substantially concentric with the external conduit, the second internal conduit comprising a first end, a second end, and a longitudinal bore having a longitudinal axis, and configured to form a second annulus between the first and second internal conduits, the burner body comprising fuel and oxidant inlet ports near the second ends of the conduits;

a burner tip body connected to the burner body at the first ends of the external and first internal conduits, the burner tip body comprising an inner wall, an outer wall, and a crown connecting the inner and outer walls, the inner wall and optionally a portion of the crown defining a fuel and oxidant mixing region and form a fuel/oxidant mixture therein;

at least a portion of the burner tip inner wall, measured from the first end of the second internal conduit, converging toward the longitudinal axis of the burner as the mixture flows therethrough and thereby create a higher pressure region near an exit of the mixing region to minimize the possibility of molten material above the burner entering the mixing region.

A second aspect of the disclosure are submerged combustion melters comprising one or more of the burners of this disclosure.

A third aspect of the disclosure are methods of producing molten glass comprising feeding glass-forming materials to a submerged combustion melter that comprises one or more of the burners of this disclosure, feeding an oxidant and a fuel to the burner, combusting the fuel and oxidant, and melting the glass-forming materials to produce molten glass.

Certain methods within the disclosure include methods wherein the fuel may be a substantially gaseous fuel, the substantially gaseous fuel selected from the group consisting of methane, natural gas, liquefied natural gas, propane, carbon monoxide, hydrogen, steam-reformed natural gas, atomized oil or mixtures thereof, and the oxidant may be an oxygen stream comprising at least 90 mole percent oxygen.

Burners, melters, and methods of the disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which:

FIGS. 5, 6B, 7A, 8A, 8B, 8D, 9A, 9B, and 9C are schematic longitudinal cross-sectional views of several other non-limiting burner embodiments in accordance with the present disclosure;

FIG. 11 is a logic diagram of a method in accordance with the present disclosure.

Figure 1:
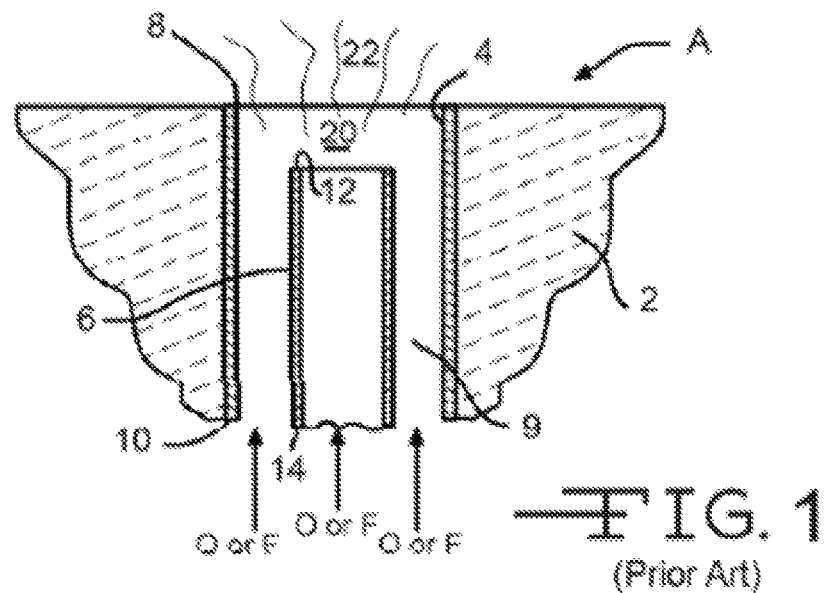
FIGS. 1 and 2 are schematic longitudinal cross-sectional views of two prior art burners.

It is to be noted, however, that the appended drawings are not to scale and illustrate only typical embodiments of this disclosure, and are therefore not to be considered limiting of its scope, for the disclosure may admit to other equally effective embodiments.

DETAILED DESCRIPTION

In the following description, numerous details are set forth to provide an understanding of the disclosed apparatus and methods. However, it will be understood by those skilled in the art that the apparatus and methods covered by the claims may be practiced without these details and that numerous variations or modifications from the specifically described embodiments may be possible and are deemed within the claims. All U.S. published patent applications and U.S. Patents referenced herein are hereby explicitly incorporated herein by reference. In the event definitions of terms in the referenced patents and applications conflict with how those terms are defined in the present application, the definitions for those terms that are provided in the present application shall be deemed controlling.

As explained briefly in the Background, one drawback to present SCMs, and in particular SC burners, is that there remains a desire for improved fuel combustion to maximize heat release from the fuel, and possibly reduce non-waste fuel and oxygen-enriched oxidant usage, as both non-waste fuel and oxygen-enriched oxidants typically require the expenditure of funds above that when the fuel is entirely waste material and the oxidant is air. Furthermore, when in use, however, some of the molten and/or still solid material can enter the central passage, particularly in floor-mounted burners, coating or partially coating the interior walls of the burner nozzle. This may lead to restricting flow of one or more of the fuel, oxidant, and fuel/oxidant mixture, and may in extreme cases lead to partial or full plugging of the nozzle, resulting in decreased or ultimately zero heat release to the molten material and/or material being melted through that particular burner.

The inventors herein have developed submerged combustion burners having improved heat release and/or less susceptibility to backflow of molten material and/or plugging while melting glass-forming materials.

Various terms are used throughout this disclosure. "Submerged" as used herein means that combustion gases emanate from combustion burners under the level of the molten glass; the burners may be floor-mounted, roof-mounted, wall-mounted, or in melter embodiments comprising more than one submerged combustion burner, any combination thereof (for example, two floor mounted burners and one wall mounted burner). "SC" as used herein means "submerged combustion" unless otherwise specifically noted, and "SCM" means submerged combustion melter unless otherwise specifically noted.

As used herein the phrase "combustion gases" as used herein means substantially gaseous mixtures comprised primarily of combustion products, such as oxides of carbon (such as carbon monoxide, carbon dioxide), oxides of nitrogen, oxides of sulfur, and water, as well as partially combusted fuel, non-combusted fuel, and any excess oxidant. Combustion products may include liquids and solids, for example soot and unburned liquid fuels.

"Oxidant" as used herein includes air and gases having the same molar concentration of oxygen as air, oxygen-enriched air (air having oxygen concentration greater than 21 mole percent), and "pure" oxygen, such as industrial grade oxygen, food grade oxygen, and cryogenic oxygen. Oxygen-enriched air may have 50 mole percent or more oxygen, and in certain embodiments may be 90 mole percent or more oxygen.

The term "fuel", according to this disclosure, means a combustible composition comprising a major portion of, for example, methane, natural gas, liquefied natural gas, propane, hydrogen, steam-reformed natural gas, atomized hydrocarbon oil, combustible powders and other flowable solids (for example coal powders, carbon black, soot, and the like), and the like. Fuels useful in the disclosure may comprise minor amounts of non-fuels therein, including oxidants, for purposes such as premixing the fuel with the oxidant, or atomizing liquid or particulate fuels. As used herein the term "fuel" includes gaseous fuels, liquid fuels, flowable solids, such as powdered carbon or particulate material, waste materials, slurries, and mixtures or other combinations thereof.

The sources of oxidant and fuel may be one or more conduits, pipelines, storage facility, cylinders, or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit.

Conduits, burner bodies, burner tips and associated components (such as spacers and supports between conduits, baffles, meshes, perforated plates and cylinders) used in SC burners, SCMs and methods of the present disclosure may be comprised of metal, ceramic, ceramic-lined metal, or combination thereof. Suitable metals include stainless steels, for example, but not limited to, 306 and 316 steel, as well as titanium alloys, aluminum alloys, and the like. Burner tips may comprise noble metals (for example platinum, rhodium, or alloys thereof) or other exotic corrosion and/or fatigue-resistant materials, and may be attached to the base metals comprising the burner body using a variety of techniques, such as brazing, flanged fittings, interference fittings, and the like. Suitable materials for the glass-contact refractory, which may be present in SC melters and downstream flow channels, and refractory burner blocks (if used), include fused zirconia ($ZrO_2$), fused cast AZS (alumina-zirconia-silica), rebonded AZS, or fused cast alumina ($Al_2O_3$). The melter geometry and operating temperature, burner and burner tip geometry and features, and type of glass to be produced, may dictate the choice of a particular material, among other parameters.

The phrase "a length sufficient to create a fuel and oxidant mixing region downstream of the inner conduit exit end", when referring to the distance of the outlet of an inner conduit to the outlet of an outer conduit, means that distance which, in conjunction with the other dimensions of the inner and outer conduits, is able to effectively mix a substantial portion of fuel and oxidant. The distance may be shorter if there are other features, such eddy generators or partial obstructions in the fuel and oxidant flow paths, and may be larger if such features or obstruction are not present.

Certain embodiments including a fluid-cooled, half-toroid burner tip may comprise a burner tip insert shaped substantially the same as but smaller than the burner tip body and positioned in an internal space defined by the burner tip body, the insert configured so that a cooling fluid may pass between internal surfaces of the burner tip body and an external surface of the insert. These embodiments may include a third internal conduit generally concentric with the external conduit and positioned between the external and the first internal conduits. A first end of the third internal conduit would be attached to the insert.

In certain embodiments, the inner and outer walls of the burner tip body may extend beyond the first end of the second internal conduit, at least partially defining a mixing region for oxidant and fuel.

Specific non-limiting SC burner, SCM, and method embodiments in accordance with the present disclosure will now be presented in conjunction with FIGS. 1-11. The same numerals are used for the same or similar features in the various figures. In the views illustrated in FIGS. 1-10, it will be understood in each case that the figures are schematic in nature, and certain conventional features are not illustrated in order to illustrate more clearly the key features of each embodiment.

Figure 2:
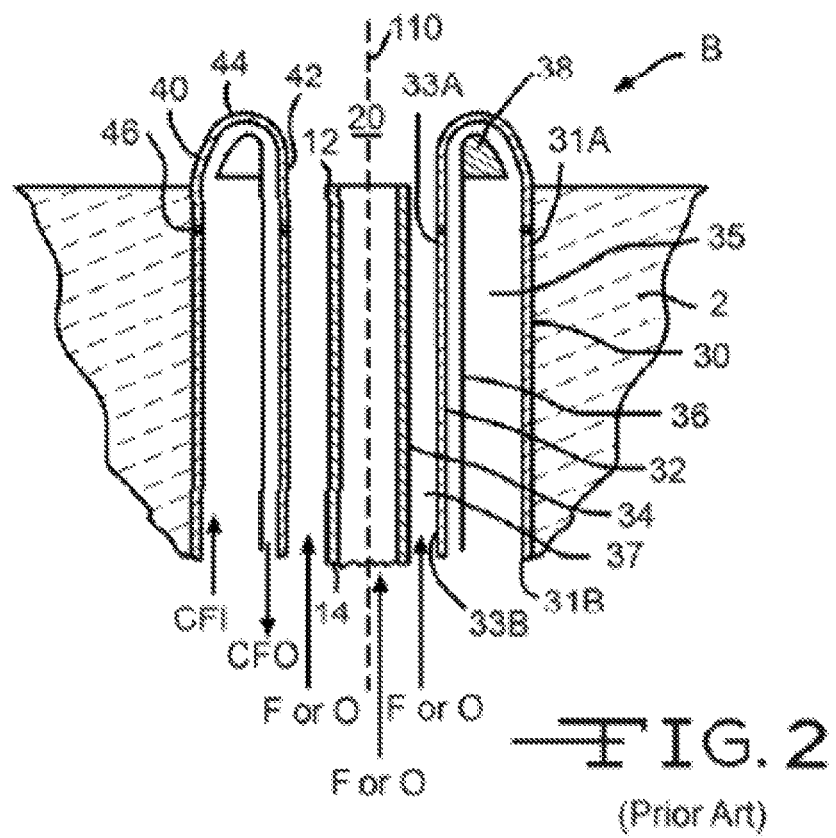

Referring now to the figures, FIGS. 1 and 2 are schematic longitudinal cross-sectional views of two prior art burners that may be improved using the teachings of the present disclosure. Prior art embodiment "A" is a non-fluid cooled burner comprising a refractory support penetrating a wall 2 of a melter, an outer conduit 4, and an inner conduit 6. Outer conduit 4 includes an outlet end 8 and an inlet end 10, while inner conduit comprises an outlet end 12 and an inlet end 14. A fuel/oxidant mixing region 20 is illustrated, as well as a flame 22. Fuel "F" or oxidant "O" may traverse through either conduit. For example, in certain embodiments, fuel traverses through inner conduit 6, while oxidant traverses through outer conduit 8, more correctly the annulus 9 between inner conduit 6 and outer conduit 8. In other embodiments, fuel flows through annulus 9 while oxidant flows through inner conduit 6. In either embodiment, the goal is to mix fuel and oxidant completely in mixing region 20. However, as previously noted, the mixing may not be complete, and maximum heat release may not be achieved.

Prior art embodiment "B" is a fluid-cooled burner comprising an external conduit 30, a first internal conduit 32 substantially concentric with external conduit 30, and a second internal conduit 34 substantially concentric with both conduits 30, 32. External conduit 30 comprises a first end 31A, a second end 31B, and a longitudinal bore having a longitudinal axis 110. First internal conduit comprises a first end 33A, a second end 33B, and a longitudinal bore having substantially same longitudinal axis 110. External conduit 30 and first internal conduit 32 form a first annulus 35 for passing a cooling fluid there between, as indicated at "cooling fluid inlet " or "CFI", and cooling fluid outlet or "CFO". Second internal conduit of embodiment B is substantially the same as conduit 6 of embodiment A (FIG. 1) and is configured to form a second annulus 37 between first and second internal conduits, 32, 34 respectively. Fuel and oxidant enter in these embodiments through inlet ports near the second ends of the conduits. As indicated in FIG. 2, either fuel or oxidant may enter and pass through conduit 34.

In exemplary embodiments, fuel passes through conduit 34, while oxidant passes through second annulus 37. A third internal conduit 36 supports a ceramic insert 38.

Still referring to FIG. 2, prior art embodiment B includes a burner tip body connected to the burner body at the first ends of external conduit 30 and first internal conduit 32, the burner tip body comprising an outer wall 40, an inner wall 42, and a crown 44 connecting walls 40, 42, where inner wall 42 and optionally a portion of crown 44 define a fuel and oxidant mixing region 20 and form a fuel/oxidant mixture therein. First ends 31A, 33A of conduits 30 and 32 may be attached to outer and inner walls 40, 42 using a brazing composition 46. The techniques of brazing and the compositions of braze material 46, conduits 30, 32, 34, 36, and burner tip walls 40, 42 and crown 44 are not critical to the present disclosure, but generally conduits 30, 32, 34, and 36 and burner tip body will be the same or different metallic materials, and the braze composition chosen accordingly. Burner tip body walls 40, 42 may be attached to conduits 30, 32 by other techniques, such as flanges, interference fittings, rings and the like, or some combination of two or more of these.

Figure 3:
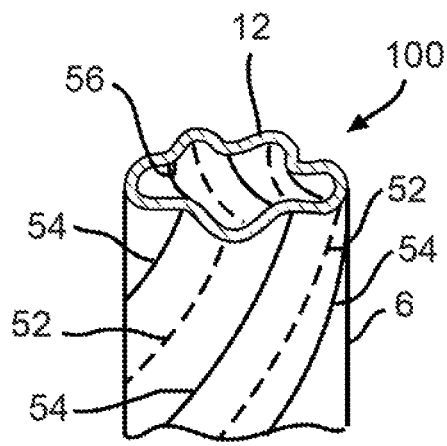
FIGS. 3 and 6A are schematic perspective views of a portion of two non-limiting burner embodiments in accordance with the present disclosure.
Figure 4A:
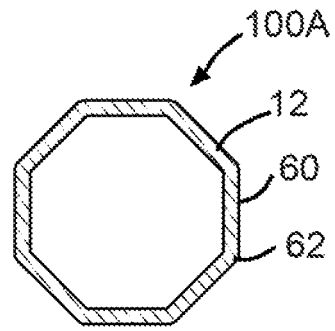
FIGS. 4A, 4B, 4C, 4D, 4E, and 4F are plan views of non-limiting alternate embodiments of the burner of FIG. 3.
Figure 4B:
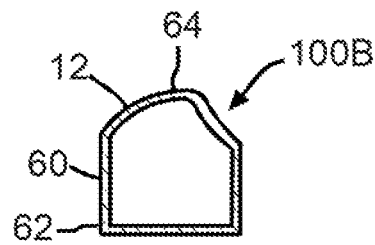
Figure 4C:
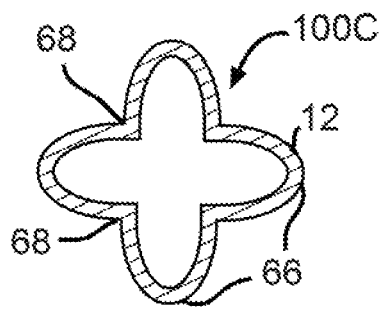
Figure 4D:
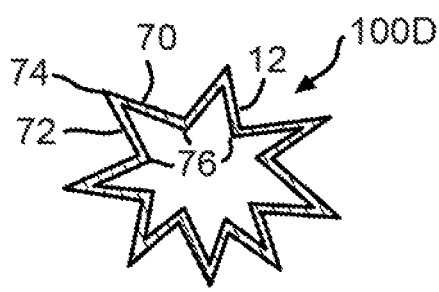
Figure 4E:
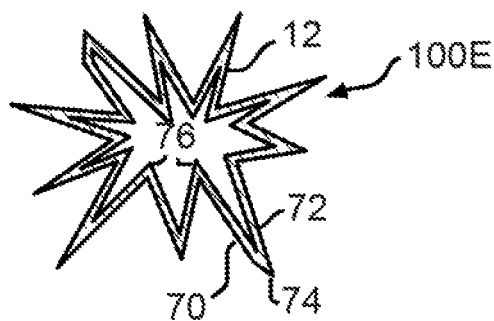
Figure 4F:
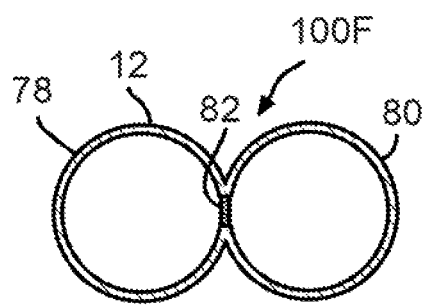

FIG. 3 is a schematic perspective view of an inner conduit embodiment 100 of the present disclosure that may be suitable for use in either of the prior art embodiments A and B. Inner conduit embodiment 100 includes a helical pattern defined by raised areas or regions 52 and low areas or regions 54, which impart a swirling motion to fuel or oxidant flowing through conduit 6. This design also creates a sinusoidal-shaped outlet end 56 that significantly increases the surface area contact between fuel and oxidant as they meet near outlet end 56 of conduit 6.

FIGS. 4A, 4B, 4C, 4D, 4E, and 4F are plan views of non-limiting alternate embodiments 100A-F, respectively, of the inner conduit embodiment 100 of FIG. 3. In certain burner embodiments in accordance with the present disclosure, at least the outlet end 12 of inner conduit 6 (and in exemplary embodiments substantially the entire length of inner conduit 6) may have cross-sectional shape is selected from the group consisting of oval, elliptical, polygonal (regular, irregular, convex, concave, and complex), curvilinear polygonal, quatrefoil, parallelogram, trapezoidal, curvilinear trapezoidal, trapezium, helical, star, and explosion. In certain burner embodiments, at least the outlet end 8 of outer conduit 4 (and in exemplary embodiments substantially the entire length of outer conduit 4) may have one of these cross-sectional shapes. In yet other embodiments, both outer conduit 4 and inner conduit 6 may have one of these shapes, which may be the same or different in exemplary embodiments. Embodiment 100A (FIG. 4A) is a hexagonal shape, having linear sides 60 and vertices 62 connecting linear sides 60. Embodiment 100B (FIG. 4B) is an example of a curvilinear polygon, wherein one side 64 is curvilinear. Embodiment 100C (FIG. 4C) is a quatrefoil shape, having two outer protrusions or lobes 66 and two inward protrusions or lobes 68. Embodiment 100D (FIG. 4D) is a star shape, having pairs of sides 70, 72, connected at vertices or outward points 74 and inward vertices or points 76. Embodiment 100E (FIG. 4E) is an "explosion" pattern, similar to embodiment 100D but more exaggerated. Embodiment 100F (FIG. 4F) is a "double-barreled shotgun" shape, having two lobes 78, 80 which may be the same or different in shape, coupled together by a central connector 82.

It should be pointed out that the embodiments illustrated schematically in FIGS. 3 and 4A-H could be used for the outer conduit of embodiment A (FIG. 1), or for both the inner and outer conduits. The purpose of these embodiments is to increase the interfacial surface area of contact between fuel and oxidant beyond that achievable by circular outlets of conduits 4, 6 typically produced by right cylinders of conduits 4, 6. Increased interfacial surface areas of fuel and oxidant should lead to better mixing of fuel and oxidant, and therefore greater efficiency of heat release to the molten material in the SCM, and/or to material being melted therein.

Figure 5:
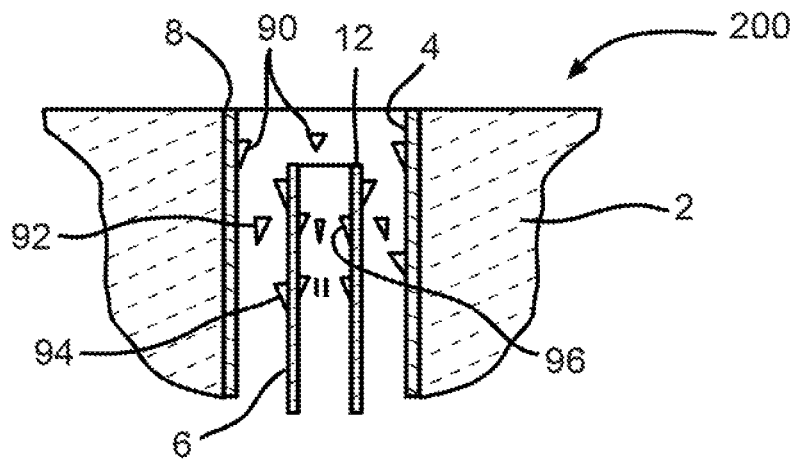

FIG. 5 is a schematic longitudinal cross-sectional view of another non-limiting burner embodiment 200 in accordance with the present disclosure. In embodiment 200, eddy-generating protrusions 90 may be provided on the inner wall of outer conduit 4, above the outlet 14 of inner conduit 6. Alternatively, or in addition thereto, eddy-generating protrusions 92 may be provided on the inner wall of outer conduit 4, below the outlet 12 of inner conduit 6. Alternatively, or in additional thereto, eddy-generating protrusions 94 may be provided on the outer surface of inner conduit 6, and/or eddy-generating protrusions 96 may be provided on the inner surface of inner conduit 6. The protrusions may be randomly or non-randomly positioned axially, radially, or circumferentially on the various conduit surfaces. The protrusions may have the same or different shape and size.

Figure 6A:
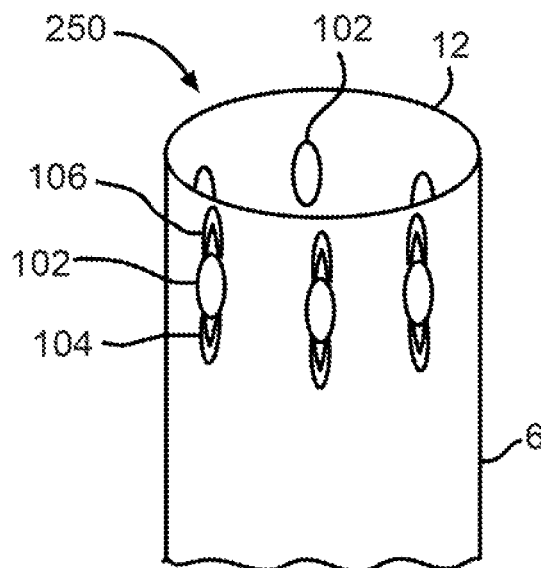
Figure 6B:
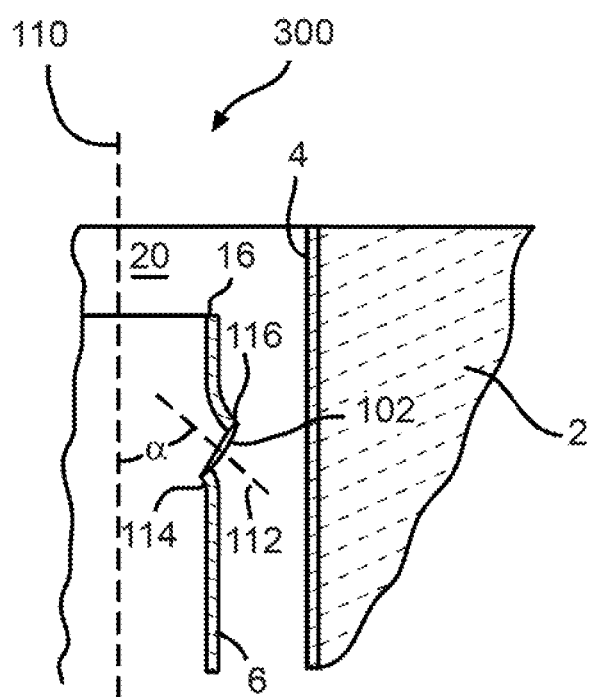

FIG. 6A is a schematic perspective view of an inner tube embodiment 250 suitable for use in burners embodiments in accordance with the present disclosure, and FIG. 6B is a schematic longitudinal cross-sectional view of a burner embodiment 300 incorporating an inner tube 6 such as illustrated in FIG. 6A. Inner tube embodiment 250 includes one or more through-holes 102 having contoured inlet areas 104 and contoured outlet areas 106 in the external surface of inner tube 6. By "contoured" is meant that the inlet and outlet areas may provide recessed areas just prior to (upstream of) the entrance to through-holes 102, and raised areas just after (downstream of) the entrance to through-holes 102, as illustrated schematically in embodiment 300 of FIG. 6B. This arrangement creates through-holes 102 having sharp edges 114, 116 able to create turbulent eddies, and a central axis 112 that is angled at an angle "α" to the longitudinal axis 110 of the burner. Burner embodiments having this arrangement have the advantage of increased fuel and oxidant mixing, even before the gases reach the "primary" mixing region 20. Angle α may range from about 20 to about 90 degrees, or from about 30 to about 80 degrees, or from about 45 to about 60 degrees.

Figure 7A:
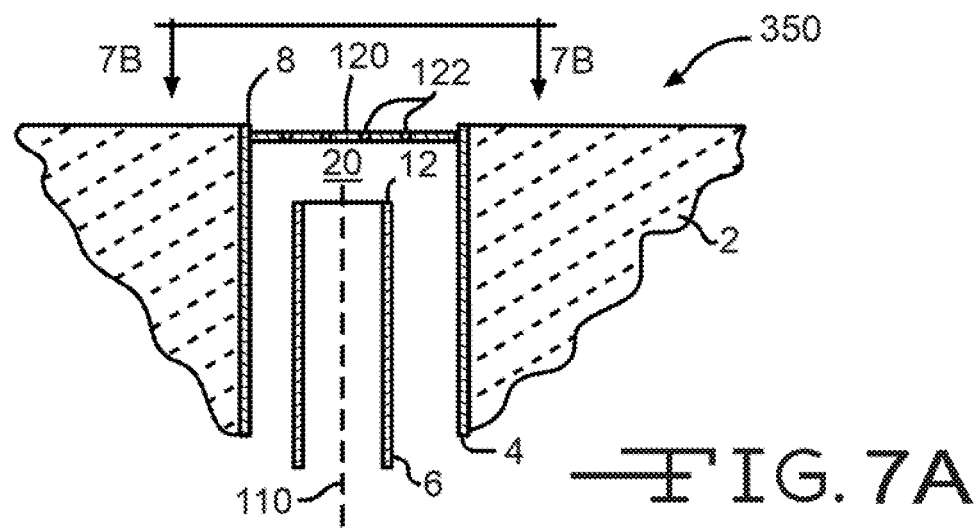
Figure 7B:
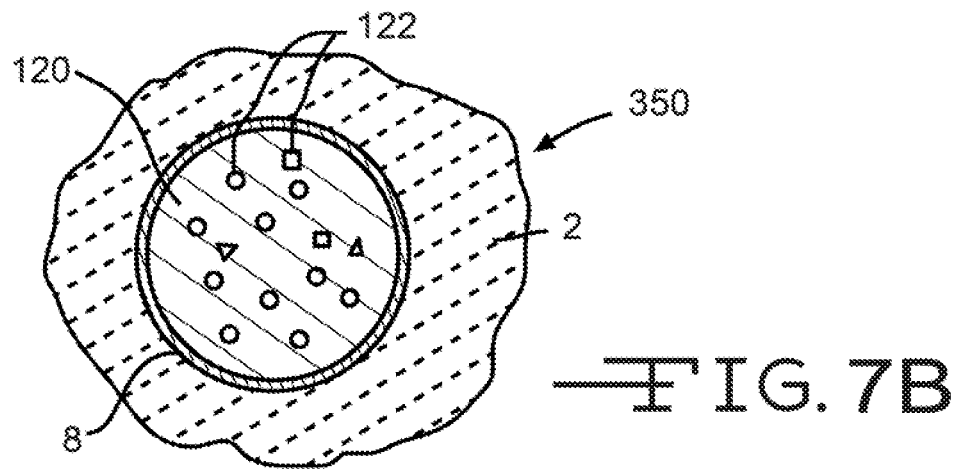
FIG. 7B is a schematic plan view of the burner embodiment illustrated schematically in FIG. 7A.

FIG. 7A is a schematic longitudinal cross-sectional view of another non-limiting burner embodiment 350 in accordance with the present disclosure, and FIG. 7B is a schematic plan view of burner embodiment 350 illustrated schematically in FIG. 7A. Embodiment 350 features a perforated plate or member 120 having a plurality of through-holes 122 therethrough having the purpose to cause a pressure build-up in mixing zone 20 and allow fuel and oxidant to mix to a greater extent than in embodiment A (FIG. 1). As illustrated schematically in FIG. 7B, through-holes 122 may be the same or different in size and shape, and may be randomly or non-randomly positioned radially and circumferentially in member 120. The ratio of total area of through-holes 122 to area of member 120 may range from about 1:10 to about 9:10, or from about 1:5 to about 4:5, or from about 3:10 to about 7:10. Plate or member 120 thickness is not critical, but may have a thickness that is not so great as to increase expense of the burner significantly, or take up too much volume of mixing region 20. In certain embodiments through-holes 122 may have recessed or raised areas similar to the areas described with reference to embodiment 300 (FIG. 6B) and may have an axis that is parallel to the burner axis 110, or non-parallel thereto. Furthermore, embodiment 350 may include one or more eddy-generators as described in reference to embodiment 200 (FIG. 5) to increase turbulence.

Figure 8A:
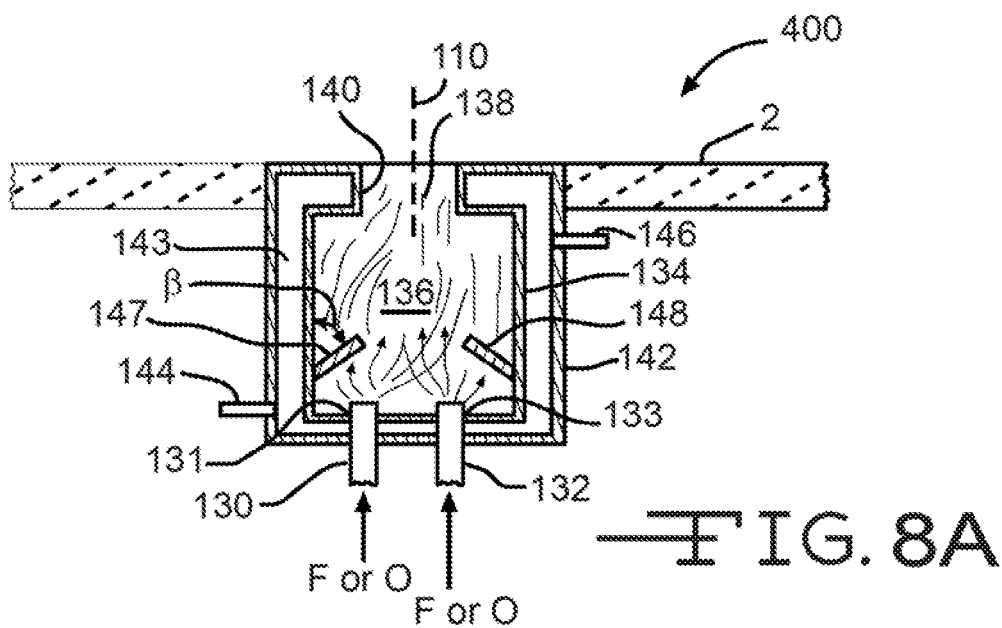
Figure 8B:
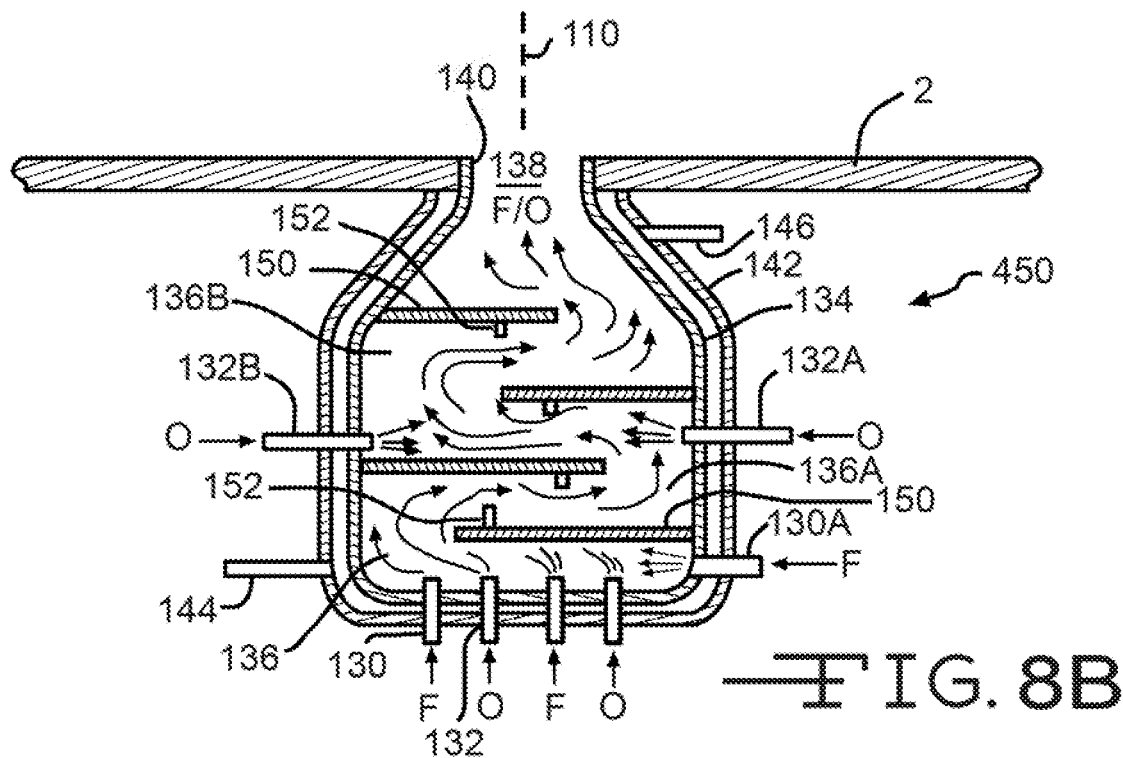

FIGS. 8A and 8B are schematic longitudinal cross-sectional views of two fluid-cooled burner embodiments 400, 450 in accordance with the present disclosure. Embodiment 400 (FIG. 8A) features separate fuel and oxidant supply conduits 130, 132 (more than one of each may be provided as further discussed herein) connected to a generally hollow burner body 134 through inlet ports 131, 133, respectively, all operating to direct fuel and oxidant to mixing chamber 136 defined by generally hollow burner body 134. Mixing chamber 136 produces a fuel/oxidant mixture 138, which leaves the burner through one or more outlet ports 140 (one outlet port being illustrated in FIG. 8A). Advantageously, one or more flow directing components, such as inclined baffles 147, 148 may be provided, attached to an internal surface of generally hollow burner body 134. Inclined baffles 147, 148, may have the same or different inclination angle "β", which may independently range from about 90 to about 20 degrees, or from about 80 degrees to about 30 degrees, or from about 70 to about 40 degrees. An outer burner body 142 is provided that defines, along with the external surface of generally hollow burner body 134, an annular region 143 suitable for flow of a cooling fluid, which may enter, for example, through an inlet conduit 144, and exit through an outlet conduit 146. The position, number, and size of fuel and oxidant inlet conduits 130, 132, and their respective inlet ports 131, 133, and baffles 147, 148 may range widely, but those skilled in the art will be able to easily determine the position, number, and sizes that best meets their needs for any application without undue experimentation.

Embodiment 450 (FIG. 8B) is similar to embodiment 400 illustrated schematically in FIG. 8A, except for the shape of generally hollow burner body 134, outer burner body 142, position of fuel and oxidant inlet conduits, and position and shape of baffles. As illustrated schematically in FIG. 8B, the shape of generally hollow burner body 134 may be any free-form shape that defines a multi-portion mixing chamber 136, which in embodiment 450 has a first portion 136A, a second portion 136B, and so on defined and separated by primary baffles 150 and secondary baffles 152. Primary baffles 150 need not be perpendicular to burner axis 110 as depicted, and secondary baffles 152 need not be perpendicular to their respective primary baffles 150, as depicted in embodiment 450. As indicated in FIG. 8B, one or more auxiliary fuel feed conduits may be provided, such as conduit 130A, that help direct fuel and oxidant entering the burner from inlet conduits 130, 132 toward the left in the figure, and/or one or more auxiliary oxidant feed conduits 132A and 132B having similar flow-directing function.

Figure 8C:
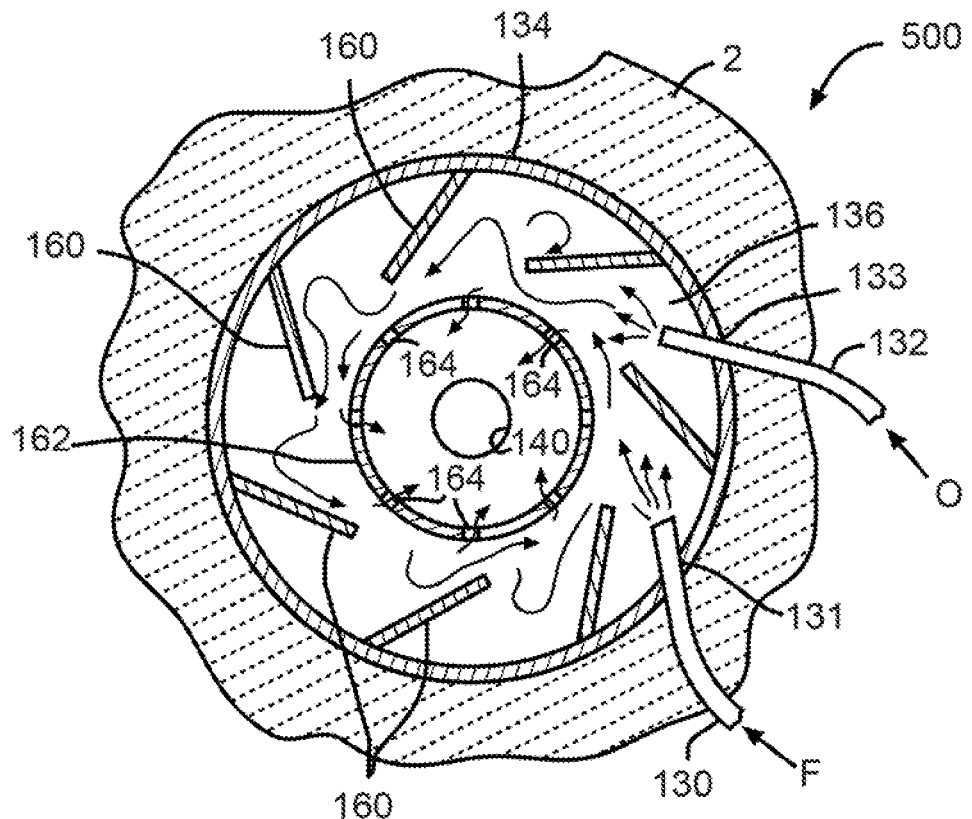
FIG. 8C is a schematic plan view of another burner embodiment.

FIG. 8C is a schematic plan view of another burner embodiment 500 in accordance with the present disclosure. Embodiment 500 features a plurality of flow directing members 160 connected to an inside surface of generally hollow burner body 134. Member 160 direct flows of fuel and oxidant from inlet conduits 130, 132 in a swirling motion, creating a multi-compartment mixing chamber 136. A perforated cylindrical member 162 having a plurality of through-holes 164 therein is positioned substantially concentrically to burner body 134. Through-holes 164 are positioned away from the entrance of fuel and oxidant into the burner to avoid channeling. An exit 140 has a diameter that is smaller than the diameter of the balance of perforated cylindrical member 162, creating a partial restriction and even further mixing of fuel and oxidant. Members 160 may be angled the same or different angles, and have a range similar to angle β discussed previously in reference to embodiment 400 (FIG. 8A). Through-holes 164 may be the same or different in size and shape, and may be randomly or non-randomly positioned axially and circumferentially in member 162. The ratio of total area of through-holes 164 to area of member 162 may range from about 1:10 to about 9:10, or from about 1:5 to about 4:5, or from about 3:10 to about 7:10. Flow direction member thickness is not critical, but may have a thickness that is not so great as to increase expense of the burner significantly, or take up too much volume of mixing chamber 136. In certain embodiments through-holes 164 may have recessed or raised areas similar to the areas described with reference to embodiment 300 (FIG. 6B) and may have an axis that is perpendicular to the burner axis, or non-perpendicular thereto. Furthermore, embodiment 500 may include one or more eddy-generators as described in reference to previous embodiments to increase turbulence. Eddy generators may be present on either (or both) sides of members 160; inside surface of burner body 134; exterior surface of member 162, interior surface of member 162, and combinations of any of these.

Embodiment 550, illustrated in longitudinal cross-section schematically in FIG. 8D, features a mesh or porous material 170 positioned inside burner body 134 that is generally conical in shape, wherein sidewalls of burner body 134 may have a angle "γ" with respect to burner longitudinal axis 110. It will be understood that any shape of burner body 134 may be used that will retain mesh or porous member 170 in place will be within this embodiment. For example, it is not necessary that side walls be angled their entire length as illustrated; a portion of the sidewalls may be angled less or not at all with respect to burner longitudinal axis 110. Angle γ may range from just above 0 to about 70 degrees, or from about 20 degrees to about 60 degrees, or from about 30 to about 40 degrees. Mesh material suitable for use as member 170 includes metallic wool; metallic and ceramic packing material such berl saddles, raschig rings, and the like; metallic ribbons, and the like. Suitable porous media include porous ceramics such as blocks of ceramic material having tortuous through-holes or pores, and the like. Mesh or porous material should produce a pressure drop of flowing oxidant, fuel, and fuel/oxidant mixture suitable to produce local pressure fluctuations inducing better mixing of fuel and oxidant than would occur without the material present.

Figure 9B:
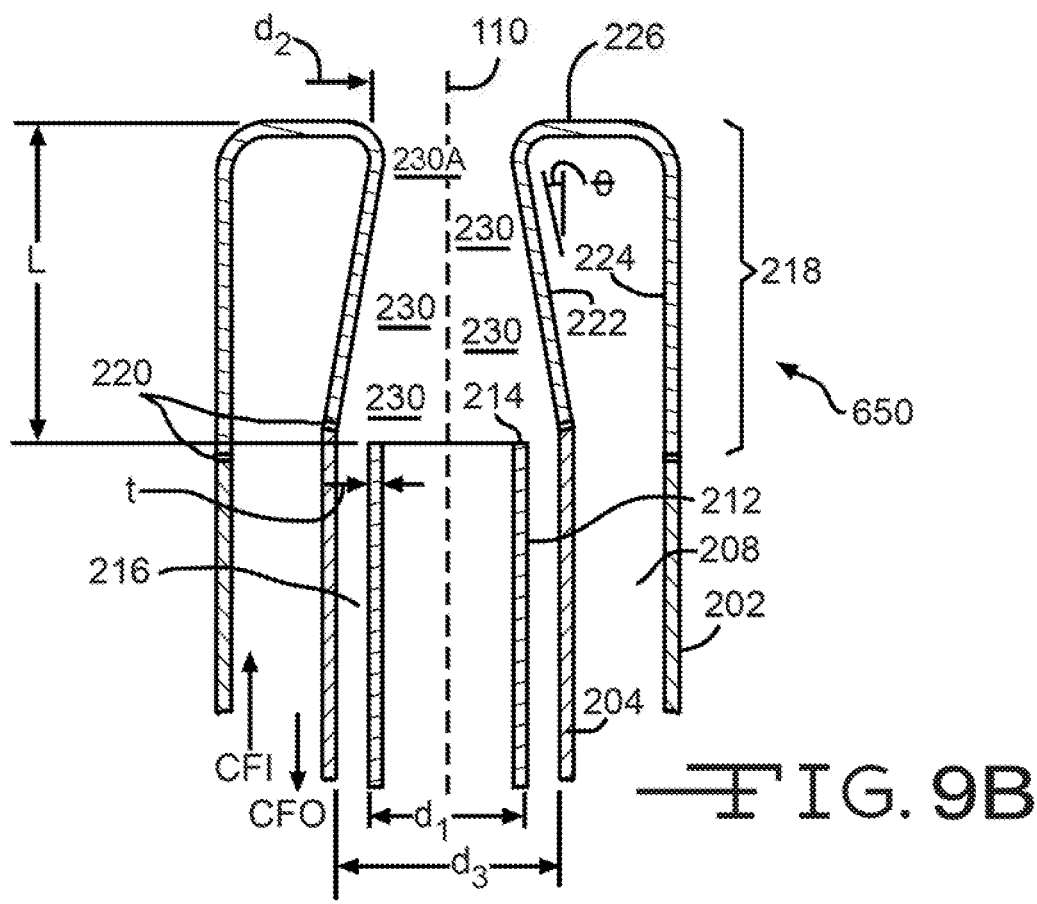
Figure 9C:
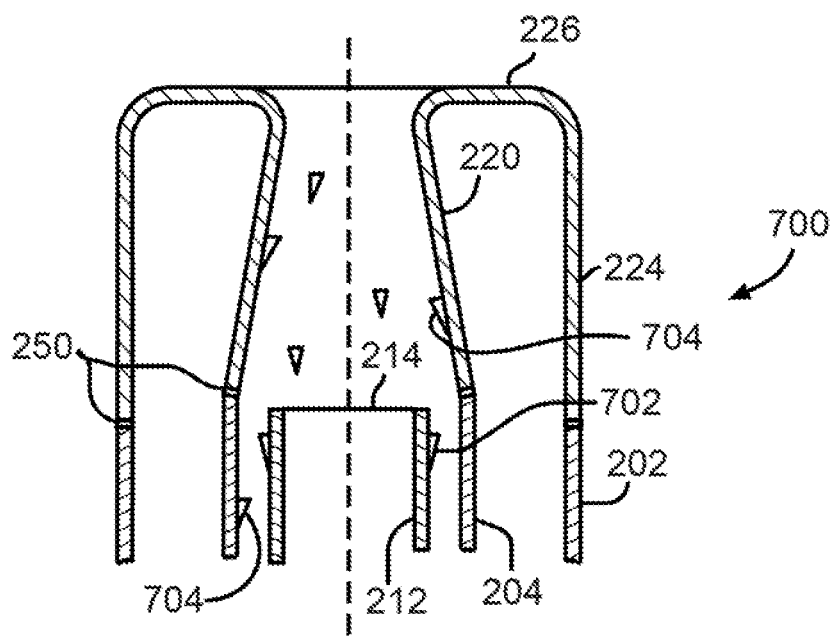

FIGS. 9A, 9B and 9C are schematic longitudinal cross-sectional views of three fluid-cooled burner embodiments 600, 650, and 700 in accordance with the present disclosure exhibiting increase fuel and oxidant mixing, and lessening the tendency for molten and solid materials plugging the burners. Embodiments 600, 650, and 700 have in common a burner body comprising an external conduit 202 and a first internal conduit 204 substantially concentric therewith, external conduit 202 comprising a first end 206, a second end (not illustrated), and a longitudinal bore having a longitudinal axis 110. First internal conduit 204 comprises a first end 210, a second end (not illustrated), and a longitudinal bore having same longitudinal axis 110. External conduit 202 and first internal conduit 204 form a first annulus 208 for passing a cooling fluid there between. A second internal conduit 212 is substantially concentric with external conduit 202. Second internal conduit 212 comprise a first end 214, a second end (not illustrated), and a longitudinal bore having same longitudinal axis 110, and configured to form a second annulus 216 between first and second internal conduits 204, 212. The burner body comprises fuel and oxidant inlet ports near the second ends of the conduits, and either fuel or oxidant may traverse second annulus 216; in embodiments where oxidant flows though second annulus 216, fuel flows through second internal conduit 212, and in embodiments where oxidant flows through second internal conduit 212, fuel flows through second annulus 216.

Embodiments 600, 650, and 700 include a burner tip body 218 connected via brazing 220 or other methods to the burner body at the first ends 206, 210 of the external and first internal conduits, respectfully. The burner tip body comprises an inner wall 222, an outer wall 224, and a crown 226 of connecting the inner and outer walls, with inner wall 222 and optionally a portion of crown 226 defining a fuel and oxidant mixing region 230 and form a fuel/oxidant mixture 228 therein. At least a portion of burner tip inner wall 222, measured from first end 214 of second internal conduit 212, converges toward longitudinal axis 110 of the burner as the mixture flows therethrough and thereby creates a higher pressure region 230A near an exit of mixing region 230 to minimize the possibility of molten material above the burner entering mixing region 230 and/or depositing on crown 226, inner wall 222, and surfaces of first and second internal conduits 204, 212. Embodiments 600, 650, and 700 may also include a third internal conduit 36 and ceramic insert 38, as illustrated in embodiment B (FIG. 2), these elements not illustrated in FIGS. 9A-C for clarity.

More specifically, embodiment 600 (FIG. 9A) features a curvilinear inner wall 222 of burner tip 218. This shape causes a pressure drop of fuel and oxidant as they pass through mixing region 230 sufficient to increase mixing of fuel and oxidant beyond what is possible in prior art embodiment B, FIG. 2, where conduit 34 is essentially parallel to inner wall 42 of the burner tip. Other important features of burner embodiment 600 are the length "L", which is the distance measured from 214 to the tip of crown 226; diameter $d_1$, the internal diameter of second internal conduit 212; diameter $d_2$, the internal diameter of the throat formed by crown 226 and/or inner wall 222; and diameter $d_3$, the internal diameter of first internal conduit 204. Also important considerations are the wall thickness of second internal conduit 212 and cooling of the burner. In general, the primary goal in embodiments 600, 650, and 700 and equivalent designs is to decrease $d_1$, $d_2$, and $d_3$ (in the cases of $d_1$ and $d_3$ at least at ends 214 and 210) to minimize the available area for molten and/or semi-molten material to enter the burners. For example, a longer length L will decrease the chance of plugging conduit 212, and smaller diameters $d_1$ and $d_3$, especially where the ratio of $d_1/d_3$ is 0.5 or higher, will increase the pressure at region 230A, as will decreasing diameter $d_2$. In general, narrowing diameter $d_2$ may be accomplished in embodiment 600 by curvilinearly narrowing inner wall 222, or, in cases where inner wall 222, outer wall 224, and crown 226 are composed of noble metals or other expensive alloys (as illustrated by different cross-hatching compared with that used for conduits 202, 204, and 212), to narrow the portion of conduit 204 extending above end 214 of second internal conduit 212. In other words, when noble metals or other expensive corrosion resistant material is used for burner tip 218, it may be advantageous to make inner wall 222 and outer wall 224 as short as possible. This is made more feasible in embodiments 600, 650, and 700 by the narrowing diameters discussed herein, as this will increase gas velocities and therefore heat transfer. With these concepts in mind, the person of ordinary skill will have no difficulty selecting values for diameters d1, d2, and d3, and length L. For reference, these diameters may each range from about 0.25 cm up to 25 cm or more, depending on the number of burners, heat input desired, heating value of the fuel, type of glass-forming materials being melted, and other parameters. Length L may range from about 5 cm up to 50 cm or more, or from about 10 cm to about 20 cm.

Embodiments 650 and 700 are similar to embodiment 600 except that inner wall 222 is linear rather than curvilinear, with inner wall 222 positioned at an angle "θ" relative to burner longitudinal axis 110. Angle θ may range from about 5 degrees up to about 80 degrees, or from about 10 degrees to about 70 degrees, or from about 20 degrees to about 60 degrees. Embodiment 700 further exemplifies that burners within these embodiments may include one or more eddy-generating features 702, 704 to further enhance mixing of fuel and oxidant.

Burner embodiments such as embodiments 600, 650, and 700 may have burner tips as illustrated to reduce stress and thermal fatigue, and may be connected to conduits 202, 204. The phrase "at least one physical convolution sufficient to increase surface area and fatigue resistance of the crown compared to a smooth, half-toroid crown of the same composition" means one or more structural features in the crown that introduce intricacy so that the crown is able to expand and contract circumferentially and/or radially. The convolutions or intricacies may have any operable shape, for example, at least one or a plurality of generally radial crown physical convolutions extending away from the generally central flow passage. The plurality of generally radial physical convolutions may form a series of alternating ridges and troughs. The series of alternating ridges and troughs may form a crown radial cross-section having a repetitive and/or periodic shape such as, but not limited to, repeating hemispheres, repeating trapezoids, repeating triangles, sinusoidal, repeating irregular shapes, repeating rectangles, sawtooth, and combinations thereof. Another example would be at least one generally non-radial crown physical convolution. Possible generally non-radial crown physical convolutions include, but are not limited to, at least one generally circumferential crown physical convolution, at least one generally spiral crown physical convolution, at least one randomly positioned convolution, at least one non-randomly positioned convolution, and combinations thereof.

In such embodiments, the at least one non-randomly positioned convolution may comprise a plurality of non-randomly spaced and non-randomly shaped depressions selected from the group consisting of a single row of oblique oval depressions, a single row of chevron depressions, a double row of oblique oval depressions, and combinations thereof. The at least one generally circumferential crown physical convolution may comprises at least one convolution positioned at the connection of the burner tip body to the external and first internal conduits. In certain embodiments, the at least one convolution may be superimposed on a burner tip body crown having a generally half-toroidal shape, the crown having a longitudinal cross-section that may be hemispherical, trapezoidal, triangular, inverted triangular, irregular, rectangular, and the like.

The thickness of crown 226 in the various embodiments illustrated herein is not critical, and need not be the same for every region of the crown. Suitable thickness may range from about 0.1 cm to about 1 cm. Thicker crowns or thicker regions of crowns will generally be stronger and exhibit more fatigue resistance, but may be more difficult to form convolutions, and thus have less surface area. Thicker crowns may also be more susceptible to cracking, as the out portions may expand more than the inner, cooled portions.

Certain burner embodiments may include an adjustable, changeable and removable structure or insert connected to end 12, 214 of inner or second internal conduit 6, 212, such as described in Applicant's U.S. Pat. No. 8,875,544 issued Nov. 4, 2014. As used herein the word "changeable", when referring to a burner feature, means that that feature may be physically different from burner to burner by machining or molding, for example, while the term "adjustable" means that a feature of a burner may actually be varied without making physical modifications to the burner. Such adjustable, changeable and removable structures or inserts include a body that is adjustable in the sense that threads or other connectors to inner conduit 12 or second internal conduit 212 allow variation of the axial position of the insert. Furthermore, physical parameters of such inserts may be changed, and the entire insert may be removed and replaced with another insert of same or different dimensions if desired. Such inserts may include a body having a central hub that is, in certain embodiments, parallel to burner longitudinal axis 110, but not necessarily so, and include a central passage having an exit that is, in certain embodiments, perpendicular to longitudinal axis 110, but not necessarily so. The body of such adjustable inserts may include one or more non-central passages, and fluids emanating from the central exit, which may be a fuel stream, and non-central passages, which may be oxidant streams, at least partially mix. The streams may be switched in certain embodiments (in other words, fuel may traverse one or more non-central passages while oxidant emanates from central exit). In embodiments where the oxidant flows through the central passage, the flame shape may be broader and the velocity of the combustion products lower in the vertical direction to enable more combustion and energy release lower in the molten glass pool to enhance efficiency.

Figure 10:
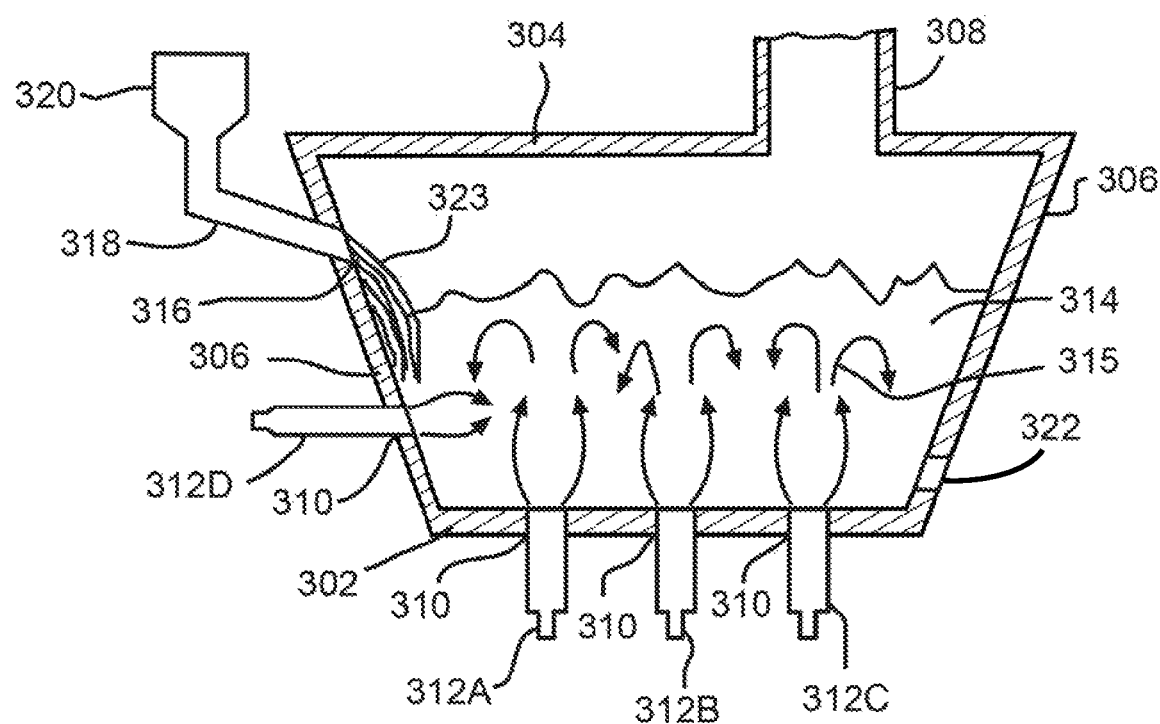
FIG. 10 is a schematic cross-sectional view of a submerged combustion melter employing one or more of the burners illustrated schematically in FIGS. 3-9.

FIG. 10 is a schematic cross-sectional view of a submerged combustion melter employing one or more of the burners illustrated schematically in FIGS. 3-9, the SCM comprising a floor 302, a roof or ceiling 304, a wall 306 having a feed opening 316, and a feeder 320 and feed chute 318 for feeding batch, cullet, waste material, or combination thereof. SCMs in accordance with the present disclosure may further include an exhaust stack 308, and ports 310 for three (or more, not illustrated) floor-mounted burners 312A, 312B, and 312C and/or sidewall-mounted submerged combustion burner 312D, which create combustion products producing turbulence 315 during operation and a highly turbulent melt in a melting zone 314. In certain embodiments, floor-mounted burners 312A, B, C may be positioned to emit combustion products into molten glass in melting zone 314 in a fashion so that the gases penetrate the melt generally perpendicularly to floor 302. In other embodiments, one or more floor-mounted burners 312 may emit combustion products into the melt at an angle to floor 302, where the angle may be more or less than 45 degrees, but in certain embodiments may be 30 degrees, or 40 degrees, or 50 degrees, or 60 degrees, or 70 degrees, or 80 degrees. Burners 312 may be air-fuel burners or oxy-fuel burners, or some combination thereof, as further described herein.

SCMs in accordance with the present disclosure may further include one or more melter exits 322 for discharging the molten glass or similar material directly into a forehearth or other downstream flow channels, glass-conditioning channels, fiber-forming bushings, and the like. SCMs in accordance with the present disclosure may feed other glass forming operations, these being merely example arrangements.

FIG. 11 is a logic diagram of one exemplary method in accordance with the present disclosure. Method embodiment 900 of FIG. 11 comprises (box 902) melting glass-forming materials in a submerged combustion melter, the melter comprising a floor, a roof, and a wall structure connecting the floor and roof, one or more of the floor, roof, and wall structure comprising fluid-cooled refractory material and an optional metallic external shell, the fluid-cooled refractory material comprising one or more coolant passages. Method embodiment 900 further comprises (box 904) combusting a fuel in one or more submerged combustion burners mounted in the floor, roof, and/or wall structure, the submerged combustion burners discharging combustion products under a level of the glass-forming material being melted in the melter and creating turbulent conditions in substantially all of the material, wherein at least one of the submerged combustion burners is selected from the group consisting of:

A) a burner comprising:
an inner conduit having inlet and exit ends; and
an outer conduit having inlet and outlet ends substantially juxtaposed to the inlet and exit ends of the inner conduit, with the proviso that the outer conduit exit end extends beyond the exit end of the inner conduit by a length sufficient to create a fuel and oxidant mixing region downstream of the inner conduit exit end, the outer conduit substantially concentric with the inner conduit; and wherein at least one of the following conditions exists:
  i) at least one of the inner and outer conduit exit ends comprises a non-circular circumferential shape sufficient to increase the interfacial surface area between the fuel and the oxidant as they meet in the mixing region, wherein the increase is relative to circular cylindrical inner and outer conduits;
  ii) wherein the inner conduit comprises one or more through-holes positioned within about three inner conduit diameters from the exit end of the inner conduit configured to provide intermixing of at least some fuel and oxidant within the inner conduit; and
  iii) wherein the burner comprises at least one obstruction in the mixing region sufficient to increase mixing between the fuel and the oxidant in the mixing region upstream of a point of combustion of the fuel and oxidant, wherein the increase is relative to a similar burner without such obstruction;

B) a burner comprising:
at least one oxidant supply conduit;
at least one fuel supply conduit;
a hollow body defining a fuel and oxidant mixing chamber, the fuel and oxidant conduits connected to corresponding inlet ports of the hollow body, the inlet ports configured to direct fuel and oxidant into the mixing chamber and create a fuel/oxidant mixture that exits the burner body through at least one fuel/oxidant mixture outlet port;
wherein the hollow body, inlet ports, and outlet ports are configured to provide the fuel and oxidant sufficient proximity, mixing distance and/or pathways to create turbulent mixing of the fuel and oxidant prior to the mixture exiting the burner and combusting; and C) a burner comprising:
a burner body comprising an external conduit and a first internal conduit substantially concentric with the external conduit, the external conduit comprising a first end, a second end, and a longitudinal bore having a longitudinal axis, the first internal conduit comprising a first end, a second end, and a longitudinal bore having a longitudinal axis, the external conduit and first internal conduit forming a first annulus for passing a cooling fluid there between, and a second internal conduit substantially concentric with the external conduit, the second internal conduit comprising a first end, a second end, and a longitudinal bore having a longitudinal axis, and configured to form a second annulus between the first and second internal conduits, the burner body comprising fuel and oxidant inlet ports near the second ends of the conduits;

a burner tip body connected to the burner body at the first ends of the external and first internal conduits, the burner tip body comprising an inner wall of the burner tip body, the burner tip body further comprising an outer wall and a crown connecting the inner and outer walls, the inner wall and optionally a portion of the crown defining a fuel and oxidant mixing region and form a fuel/oxidant mixture therein;

at least a portion of the burner tip inner wall, measured from the first end of the second internal conduit, converging toward the longitudinal axis of the second internal conduit as the mixture flows therethrough and thereby create a higher pressure region near an exit of the mixing region to minimize the possibility of molten material above the burner entering the mixing region.

Burner tips, conduits, flow directing members, adjustable bodies, and other components used in burners of the present disclosure may be comprised of metal, ceramic, ceramic-lined metal, or combination thereof. Suitable metals include stainless steels, for example, but not limited to, 306, 316, as well as titanium alloys, aluminum alloys, and the like. High-strength materials like C-110 and C-125 metallurgies that are NACE qualified may be employed. (As used herein, "NACE" refers to the corrosion prevention organization formerly known as the National Association of Corrosion Engineers, now operating under the name NACE International, Houston, Tex.) Use of high strength steel and other high strength materials may significantly reduce the wall thickness required, reducing weight of the burners. Threaded connections may eliminate the need for $3^{rd}$ party forgings and expensive welding or brazing processes—considerably improving system delivery time and overall cost. It will be understood, however, that the use of $3^{rd}$ party forgings, welding, and brazing are not ruled out for burners described herein, and may actually be preferable in certain situations. The skilled artisan, having knowledge of the particular application, pressures, temperatures, and available materials, will be able design the most cost effective, safe, and operable burners for each particular application without undue experimentation.

If ceramic materials are used, suitable materials may include fused zirconia ($ZrO_2$), fused cast AZS (alumina-zirconia-silica), rebonded AZS, or fused cast alumina ($Al_2O_3$). The choice of a particular material is dictated among other parameters by the chemistry, pressure, and temperature of fuel and oxidant used and type of glass melt to be produced.

Burner outer and inner conduits 4, 6, generally hollow burner bodies, and burner tips described herein may be made using a variety of processes, including molding, machining, and like processes. While the helical, star, explosion, and other conduit shapes, curvilinear burner bodies, and convoluted shapes of burner tips may be more complex to manufacture than the prior art components, these components may be net-shape cast (or near-net shape cast) using rapid prototype (RP) molds. Matching or substantially matching burner tip inserts may similarly be RP molded and cast of the same or substantially similar shape as the burner tips, thereby ensuring proper cooling water velocity just under the surface of the burner tip material (inside the crown and inner and outer walls of the burner tips). Net-shape or near-net shape casting methods of making a variety of molds for producing a variety of complex products are summarized in patents assigned to 3D Systems, Inc., Rock Hill, S.C., U.S.A., for example U.S. Pat. No. 8,285,411. As summarized in the '411 patent, a number of technologies presently exist for the rapid creation of models, prototypes, and objects for limited run manufacturing. These technologies are generally called Solid Freeform Fabrication ("SFF") techniques. Some SFF techniques include stereolithography, selective deposition modeling, laminated object manufacturing, selective phase area deposition, multi-phase jet solidification, ballistic particle manufacturing, fused deposition modeling, particle deposition, laser sintering, film transfer imaging, and the like. Generally in SFF, complex parts are produced from a build material in an additive fashion as opposed to conventional fabrication techniques, which are generally subtractive in nature. For example, in most conventional fabrication techniques material is removed by machining operations or shaped in a die or mold to near net shape and then trimmed. In contrast, additive fabrication techniques incrementally add portions of a build material to targeted locations, layer by layer, in order to build a complex part. SFF technologies typically utilize a computer graphic representation of a part and a supply of a build material to fabricate the part in successive layers.

According to the '411 patent, SFF technologies may dramatically shorten the time to develop prototype parts, can produce limited numbers of parts in rapid manufacturing methods, and may eliminate the need for complex tooling and machining associated with conventional subtractive manufacturing methods, including the need to create molds for custom applications. In addition, customized parts can be directly produced from computer graphic data (e.g., computer-aided design (CAD) files) in SFF techniques. Generally, in most techniques of SFF, structures are formed in a layer by layer manner by solidifying or curing successive layers of a build material. For example, in stereolithography a tightly focused beam of energy, typically in the ultraviolet radiation band, is scanned across sequential layers of a liquid photopolymer resin to selectively cure resin of each layer to form a multilayered part. In selective laser sintering, a tightly focused beam of energy, such as a laser beam, is scanned across sequential layers of powder material to selectively sinter or melt powder in each layer to form a multilayered part. In selective deposition modeling, a build material is jetted or dropped in discrete droplets, or extruded through a nozzle, such that the build material becomes relatively rigid upon a change in temperature and/or exposure to actinic radiation in order to build up a three-dimensional part in a layerwise fashion. In another technique, film transfer imaging ("FTI"), a film transfers a thin coat of resin to an image plane area where portions of the resin corresponding to the cross-sectional layer of the part are selectively cured with actinic radiation to form one layer of a multilayer part. Certain SFF techniques require the part be suspended from a supporting surface such as a build pad, a platform, or the like using supports that join the part to the supporting surface. Prior art methods for generating supports are described in U.S. Pat. Nos. 5,595,703; 6,558,606; and 6,797,351.

The Internet website of Quickparts.com, Inc., Atlanta, Ga., a subsidiary of 3D Systems Inc., has more information on some of these techniques and materials that may be used.

This website explains that stereolithography ("SLA") is a rapid prototyping process that typically uses a vat of liquid UV-curable photopolymer resin and a UV laser to build parts one layer at a time, and that SLA is often considered the pioneer of the RP industry, with the first commercial system introduced in 1988 by 3D Systems. The system consists of an Ultra-Violet Laser, a vat of photo-curable liquid resin, and a controlling system. A platform is lowered into the resin (via an elevator system), such that the surface of the platform is a layer-thickness below the surface of the resin. The laser beam then traces the boundaries and fills in a two-dimensional cross section of the model, solidifying the resin wherever it touches. Once a layer is complete, the platform descends a layer thickness, resin flows over the first layer, and the next layer is built. This process continues until the model is complete. Once the model is complete, the platform rises out of the vat and the excess resin is drained. The model is then removed from the platform, washed of excess resin, and then placed in a UV oven for a final curing. Smoothing the "stair-steps" then finishes the stereolithography model. According to his website, currently the maximum dimensions for parts produced in this manner are 25 inches×25 inches×21 inches (64 cm×64 cm×53 cm), but parts with larger dimensions may also be produced. Stereolithography material choices include technician's choice, semi-flexible, polyethylene ("PE")-like compositions, such as those known under the trade designation SOMOS 8110; durable, polypropylene ("PP")-like/acrylonitrile-butadiene-styrene ("ABS")-like compositions such as those known under the trade designations ACCURA 25 and SOMOS 9420; ABS-like compositions such as those known under the trade designations ACCURA XTREME, ACCURA 55, RENSHAPE 7811, RENSHAPE 7820, and SOMOS 18420; high-impact ABS-like compositions such as those known under the trade designation SOMOS NeXt; rigid, polycarbonate ("PC")-like compositions such as those known under the trade designations ACCURA 60, SOMOS 11122, and ACCURA CLEARVUE; high-temperature ABS-like compositions such as those known under the trade designation ACCURA BLUESTONE; high temperature PC-like, rigid compositions such as those known under the trade designation ACCURA PEAK; and high resolution, ABS-like, durable, rigid compositions such as those known under the trade designation ACCURA XTREME.

As noted in the Quickparts.com, Inc. website, standard stereolithography tolerances are currently +/−0.005 inch (0.013 cm) for the first inch (first 2.5 cm), and +/−0.002 inch (0.005 cm) on every inch (2.5 cm) thereafter. In the z height (vertical), standard tolerances range from +/−0.01 inch (0.025 cm) for the first inch (first 2.5 cm), +/−0.002 inch (0.005 cm) on every inch (2.5 cm) thereafter. Stereolithography layer thicknesses depend on the resolution, but for high-resolution range from 0.002 to 0.004 inch (0.005 cm to 0.01 cm); for standard resolution range from 0.005 to 0.006 inch (0.013 to 0.015 cm). Nickel-plating may provide added strength, waterproofing, and electrical conductivity to stereolithography prototypes.

As further noted in the Quickparts.com, Inc. website, Selective Laser Sintering ("SLS") is a rapid prototyping process that uses a high power laser to fuse small particles of powder to build parts one layer at a time to form a solid model. The system typically consists of a laser, part chamber, and control system. The part chamber typically consists of a build platform, powder cartridge, and leveling roller. A thin layer of build material is spread across the platform where the laser traces a two-dimensional cross section of the part, sintering the material together. The platform then descends a layer thickness and the leveling roller pushes material from the powder cartridge across the build platform, where the next cross section is sintered to the previous. This continues until the part is completed. Once the model is complete, it is removed from the part chamber and finished by removing any loose material and smoothing the visible surfaces. This technique is capable of producing snap fits and living hinges. According to his website, currently the maximum dimensions for parts produced in this manner are 28 inches×19 inches×19 inches (72 cm×48 cm×48 cm), but parts with larger dimensions may also be produced. SLS material choices include nylon compositions such as those known under the trade designation DURAFORM PA; glass-filled nylon compositions such as those known under the trade designation DURAFORM GF; and flame retardant nylon compositions and durable nylon compositions such as those known under the trade designation DURAFORM EX. As reported on this website, standard tolerances are +/31 0.005 inch (0.0013 cm) for the first inch (first 2.5 cm), and +/−0.003 inch (0.008 cm) for each additional inch (2.5 cm). In the z height (vertical), standard tolerances of +/−0.01 inch (0.03 cm) for the first inch (first 2.5 cm), +/−0.003 inch (0.008 cm) on every inch (2.5 cm) thereafter. Layer thicknesses are typically 0.004 inch (0.01 cm). The products made by SLS are said to exhibit high-heat chemical resistance.

As further noted in the Quickparts.com, Inc. website, Fused Deposition Modeling ("FDM") is a rapid prototyping process that uses a plastic filament of material supplied to an extrusion nozzle. The nozzle is heated to melt the material and can be moved in both horizontal and vertical directions, extruding material, layer-by-layer, to build a model. The systems typically consist of a build platform, extrusion nozzle, and control system. The build material, a production quality thermoplastic, is melted and then extruded through a specially designed head onto a platform to create a two-dimensional cross section of the model. The cross section quickly solidifies, and the platform descends where the next layer is extruded upon the previous layer. This continues until the model is complete, where it is then removed from the build chamber and cleaned. According to his website, currently the maximum dimensions for parts produced in this manner are 20 inches×20 inches×20 inches (51 cm×51 cm×51 cm), but parts with larger dimensions may also be produced. Material choices include production-quality ABS (red, yellow, green, blue, gray, steel gray, white, and black); compositions such as those known under the trade designation ABS-M30 (white, red, blue, and gray); polycarbonate (white); PC-ABS (black), and compositions such as those known under the trade designation PC-ISO (white and translucent), ULTEM, and PPSF (tan). Dimensional tolerances are +/−0.005 inch (0.013 cm) for the first inch (first 2.5 cm), and +/−0.002 inch (0.005 cm) for each additional inch (2.5 cm). In the z height (vertical), standard tolerances of +/−0.01 inch (0.03 cm) for the first inch (first 2.5 cm), +/−0.002 inch (0.005 cm) on every inch (2.5 cm) thereafter. Layer thickness depends on resolution; for standard resolution, 0.01 inch (0.03 cm). Minimum wall thickness is 0.02 inch (0.06 cm).

As further noted in the Quickparts.com, Inc. website, the process known under the trade designation POLYJET is a rapid prototyping process that jets photopolymer materials in ultra-thin layers (16 micrometers) onto a build tray layer by layer until the part is completed. Each photopolymer layer is cured by UV light immediately after it is jetted. This is indicated to be a new RP process that provides a quick turn around for smooth, fully cured parts. The process typically consists only of UV bulbs and photopolymer materials, and the machines may fully cure each layer of super fine UV photopolymer and support materials as eight jetting heads precisely deposit the product. Support materials are indicated to be easily separated from the part by either a water jet or hand and brush. No special baths or extra finishing treatments are needed. Finished parts can readily absorb paint and can also be machined, drilled, chrome-plated or used as molds. According to his website, currently the maximum dimensions for parts produced in this manner are 19.3 inches×15.4 inches×7.9 inches (49 cm×39 cm×20 cm), but parts with larger dimensions may also be produced. Material choices include compositions such as those known under the trade designations 61A elastomeric TANGOBLACK, also available as POLYJET FC970; 75A elastomeric TANGOGRAY, also available as POLYJET FC950; elastomeric/rubber-like TANGOPLUS, also available as POLYJET FC930; high-resolution, rigid, translucent compositions such as those known under the trade designation POLYJET FC720; high-resolution, rigid compositions such as those known under the trade designation VEROBLUE, also available as POLYJET FC840; high-resolution, rigid compositions such as those known under the trade designation VEROWHITE, also available as POLYJET FC830; high-resolution, rigid compositions such as those known under the trade designation VEROBLACK, also available as POLYJET FC830; and PP-like compositions such as those known under the trade designation DURUS WHITE (FC430). Standard tolerances are disclosed as being +/−0.005 inch (0.013 cm) for the first inch (first 2.5 cm), +/−0.002 inch (0.005 cm) on every inch (2.5 cm) thereafter. In the z height (vertical), standard tolerances are noted as being +/−0.01 inch (0.03 cm) for the first inch (first 2.5 cm), +/−0.002 inch (0.005 cm) on every inch (2.5 cm) thereafter. Layer thickness is noted as being as little as 16 micrometers (0.0006 inch).

In operation of burners of the disclosure, in exemplary embodiments oxidant and fuel are separately fed to the burners through various inlet ports. An inorganic glass-forming material is charged to the melter. The mass flow rate of the inorganic material, for example glass-forming materials, is a function of the composition of the feed material, desired composition, viscosity, and temperature of the molten glass, the flame temperature of the burner(s), the burner geometry, for example burner exit, nozzle exit, and non-central passages sizes, the pressure in the mixing region of the burner, and other parameters. The process operating conditions are generally not independent values but have some degree of interaction. Oxygen-enhanced oxidant/fuel melting is markedly different than the traditional air-fuel melting processes. The general principle is to operate combustion in the mixing region of the burner in a manner that replaces some of the air with a separate source of oxygen. The overall combustion ratio may not change. The process of combining fuel and oxygen-enriched oxidant will, in most embodiments, primarily occur in the mixing region, after the gases have passed over a flame arrestor safety device. Varying the oxygen content of the oxidant can control the flame temperature of the combustion gases.

In general, the second internal conduit 212 in embodiments 600, 650, and 700 may have an inner diameter (ID) ranging from about 1 inch up to about 5 inches (2.5 cm to 13 cm), or from about 2 inches up to about 4 inches (5 cm to 10 cm).

The total quantities of fuel and oxidant used by burners of the present disclosure may be such that the flow of oxygen may range from about 0.9 to about 1.2 of the theoretical stoichiometric flow of oxygen necessary to obtain the complete combustion of the fuel flow. Another expression of this statement is that the combustion ratio may range from about 0.9 to about 1.2.

The velocity of the fuel, oxidant and fuel/oxidant mixture in the various burner embodiments of the present disclosure depends on the burner geometry used, but generally in embodiments 600, 650, and 700 is at least about 15 meters/second (m/s) in the widest cross-sectional areas of the burners, and increases significantly as the diameters of the conduits and inner wall of the burner tip decrease. Certain burners within embodiments 600, 650, and 700 may be characterized as high momentum submerged combustion burners. As used herein the phrase "high momentum" combustion burners means burners configured to have a fuel/oxidant mixture velocity ranging from about 150 ft./second to about 1000 ft./second (about 46 meters/second to about 305 meters/second). As used herein the phrase "low momentum" combustion burners means burners configured to have a fuel velocity ranging from about 6 ft./second to about 40 ft./second (about 2 meters/second to about 12 meters/second) and an oxidant velocity ranging from about 6 ft./second to about 40 ft./second (about 2 meters/second to about 12 meters/second). The upper limit of fuel/oxidant mixture velocity depends primarily on the desired penetration of flame and/or combustion products into the glass melt and the geometry of the burner; if the velocity is too low, the flame temperature may be too low providing inadequate temperature in the melter, and molten material may enter the burner, both of which are not desired. If the fuel and oxidant, and fuel/oxidant mixture flow velocities are too high, flame and/or combustion products might impinge on a melter wall or roof, or cause carryover of melt into the exhaust, or be wasted, which is also not desired. Oxidant velocities depend on fuel flow rate and fuel velocity, but in general should not exceed about 200 ft/sec at 400 scfh flow rate in widest portions of the burner conduits, and increase significantly downstream thereof. The pressure in mixing region of burners in accordance with the present disclosure should exceed about 10 psig (170 kPa absolute pressure), and preferably exceeds 20 psig.

In burner embodiments 100, 200, 250, 300, 350, 400, 450, 500, and 550 the goal is not so much to increase the velocities of fuel and oxidant, although in certain embodiments the velocities continuously increase as the fuel and oxidant move through the burner, but to increase the mixing for increased heat release.

SC burners and methods of the present disclosure are intended to be used, for example, to replace combustion burners in already existing SCMs, and/or to be used as the main source of energy in new SCMs.

Certain SCMs and method embodiments of this disclosure may be controlled by one or more controllers. A master controller may be employed, but the disclosure is not so limited, as any combination of controllers could be used. The controller may be selected from PI controllers, PID controllers (including any known or reasonably foreseeable variations of these), and may compute a residual equal to a difference between a measured value and a set point to produce an output to one or more control elements. The controller may compute the residual continuously or non-continuously. Other possible implementations of the disclosure are those wherein the controller comprises more specialized control strategies, such as strategies selected from feed forward, cascade control, internal feedback loops, model predictive control, neural networks, and Kalman filtering techniques. For example, burner combustion (flame) temperature may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters the burner, temperature of the primary oxidant as it enters the burner, temperature of the effluent, pressure of the primary oxidant entering the burner, humidity of the oxidant, burner geometry, combustion ratio, and combinations thereof. Certain SCMs and methods of this disclosure may also measure and/or monitor feed rate of batch or other feed materials, such as glass batch, cullet, mat or wound roving and treatment compositions, mass of feed, and use these measurements for control purposes. Exemplary systems and methods of the disclosure may comprise a combustion controller which receives one or more input parameters selected from velocity of the fuel, velocity of oxidant, mass and/or volume flow rate of the fuel, mass and/or volume flow rate of oxidant, energy content of the fuel, temperature of the fuel as it enters the burner, temperature of the oxidant as it enters the burner, pressure of the oxidant entering the burner, humidity of the oxidant, burner geometry, oxidation ratio, temperature of the burner combustion products, temperature of melt, composition of bubbles and/or foam, and combinations thereof, and may employ a control algorithm to control combustion temperature, treatment composition flow rate or composition, based on one or more of these input parameters.

The term "control", used as a transitive verb, means to verify or regulate by comparing with a standard or desired value. Control may be closed loop, feedback, feed-forward, cascade, model predictive, adaptive, heuristic and combinations thereof. The term "controller" means a device at least capable of accepting input from sensors and meters in real time or near-real time, and sending commands directly to burner control elements, and/or to local devices associated with burner control elements able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules.

The phrase "PID controller" means a controller using proportional, integral, and derivative features. In some cases the derivative mode may not be used or its influence reduced significantly so that the controller may be deemed a PI controller. It will also be recognized by those of skill in the control art that there are existing variations of PI and PID controllers, depending on how the discretization is performed. These known and foreseeable variations of PI, PID and other controllers are considered within the disclosure.

The controller may utilize Model Predictive Control (MPC). MPC is an advanced multivariable control method for use in multiple input/multiple output (MIMO) systems. MPC computes a sequence of manipulated variable adjustments in order to optimise the future behavior of the process in question. It may be difficult to explicitly state stability of an MPC control scheme, and in certain embodiments of the present disclosure it may be necessary to use nonlinear MPC. In so-called advanced control of various systems, PID control may be used on strong mono-variable loops with few or nonproblematic interactions, while one or more networks of MPC might be used, or other multivariable control structures, for strong interconnected loops. Furthermore, computing time considerations may be a limiting factor. Some embodiments may employ nonlinear MPC.

Certain SCMs and method embodiments of this disclosure may include fluid-cooled panels such as disclosed in Applicant's U.S. Pat. No. 8,769,992 issued Jul. 9, 2014. In certain system and process embodiments, the SCM may include one or more adjustable flame submerged combustion burners comprising one or more oxy-fuel combustion burners, such as described in Applicant's U.S. Pat. No. 8,875,544 issued Nov. 4, 2014. In certain systems and processes, the SCM may comprise a melter exit structure designed to minimize impact of mechanical energy, such as described in Applicant's U.S. Pat. No. 9,145,319 issued Sep. 29, 2015. Certain systems and processes of the present disclosure may utilize measurement and control schemes such as described in Applicant's U.S. Pat. No. 9,096,453 issued Aug. 4, 2015, and/or feed batch densification systems and methods as described in Applicant's U.S. Pat. No. 9,643,869 issued May 9, 2017. Certain SCMs and processes of the present disclosure may utilize devices for delivery of treating compositions such as disclosed in Applicant's U.S. Pat. No. 8,973,405 issued Mar. 10, 2015.

In certain embodiments, SCM side walls may have a free-flowing form, devoid of angles. In certain other embodiments, side walls may be configured so that an intermediate location may comprise an intermediate region of the melter having constant width, extending from a first trapezoidal region to the beginning of a narrowing melting region. Other embodiments of suitable melters are described in the above-mentioned '992 Patent.

Glass-contact refractory linings may be used to reduce wear of refractory in SCMs of this disclosure. Glass-contact refractory linings may be 3 inches, 4 inches, 5 inches or more (8 cm, 10 cm, or 13 cm or more) in thickness, however, greater thickness may entail more expense without resultant greater benefit. The refractory lining may be one or more layers. Glass-contact refractory used in flow channels described herein may be fused cast materials based on AZS (alumina-zirconia-silica), α/β alumina, zirconium oxide, chromium oxide, chrome corundum, so-called "dense chrome", and the like. One "dense chrome" material is available from Saint Gobain under the trade name SEFPRO, such as C1215 and C1221. Other useable "dense chrome" materials are available from the North American Refractories Co., Cleveland, Ohio (U.S.A.) under the trade designations SERV 50 and SERV 95. Other suitable materials for components that require resistance to high temperatures are fused zirconia ($ZrO_2$), fused cast AZS (alumina-zirconia-silica), rebonded AZS, or fused cast alumina ($Al_2O_3$). The choice of a particular material is dictated among other parameters by the geometry of the melter and the type of glass being produced.

Yet other systems and methods may employ a lance above the melt if the melt is foamy and foam is not desired in the submerged combustion melter, as described in Applicant's U.S. Pat. No. 9,021,838 issued May 5, 2015.

The term "fluid-cooled" means use of a coolant fluid (heat transfer fluid) to transfer heat away from the burner exterior conduit, burner tip, or burner body, as the case may be. Heat transfer fluids may be any gaseous, liquid, or some combination of gaseous and liquid compositions that functions or is capable of being modified to function as a heat transfer fluid. Gaseous heat transfer fluids may be selected from air, including ambient air and treated air (for example, air treated to remove moisture), inorganic gases, such as nitrogen, argon, and helium, organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from liquids that may be organic, inorganic, or some combination thereof, for example, salt solutions, glycol solutions, oils and the like. Other possible heat transfer fluids include steam (if cooler than the expected glass melt temperature), carbon dioxide, or mixtures thereof with nitrogen. Heat transfer fluids may be compositions comprising both gas and liquid phases, such as the higher chlorofluorocarbons.

Certain SCMs of this disclosure may comprise one or more non-submerged burners. Suitable non-submerged combustion burners may comprise a fuel inlet conduit having an exit nozzle, the conduit and nozzle inserted into a cavity of a ceramic burner block, the ceramic burner block in turn inserted into either the SCM roof or the SCM wall structure, or both the SCM roof and SCM wall structure. Downstream flow channels may also comprise one or more non-submerged burners.

In certain SCMs, one or more burners in the SCM and/or flow channel(s) downstream thereof may be adjustable with respect to direction of flow of the combustion products. Adjustment may be via automatic, semi-automatic, or manual control. Certain system embodiments may comprise a burner mount that mounts the burner in the wall structure, roof, or floor of the SCM and/or flow channel comprising a refractory, or refractory-lined ball joint. Other burner mounts may comprise rails mounted in slots in the wall or roof. In yet other embodiments the burners may be mounted outside of the melter or channel, on supports that allow adjustment of the combustion products flow direction. Useable supports include those comprising ball joints, cradles, rails, and the like.

SCMs of the present disclosure may be fed a variety of feed materials. In SCMs processing glass batch, the initial raw material may include any material suitable for forming molten glass such as, for example, limestone, glass, sand, soda ash, feldspar and mixtures thereof. A glass composition for producing glass fibers known as "E-glass" typically includes 52-56% $SiO_2$, 12-16% $Al_2O_3$, 0-0.8% $Fe_2O_3$, 16-25% CaO, 0-6% MgO, 0-10% $B_2O_3$, 0-2% $Na_2O+K_2O$, 0-1.5% $TiO_2$ and 0-1% $F_2$. Other glass compositions may be used, such as those described in Applicant's published U.S. applications 2007/0220922A1 and 2008/0276652A1. The initial raw material to provide these glass compositions can be calculated in known manner from the desired concentrations of glass components, molar masses of glass components, chemical formulas of batch components, and the molar masses of the batch components. Typical E-glass batches include those reproduced in Table 1, borrowed from the 2007/0220922 application. Notice that during glass melting, carbon dioxide (from lime) and water (borax) evaporate. The initial raw material can be provided in any form such as, for example, relatively small particles.

TABLE 1

Typical E-glass batches

| Raw material | A Limestone (Baseline) | B Quicklime | C Ca Silicate | D Volcanic Glass | E Ca Silicate & Volcanic Glass | F Quartz-free #1 | G Quartz-free #2 | H Limestone/ Slag | I Ca-Silicate/ Slag | J Quartz-free #3 | K Quartz and Clay free | L Ca-Silicate/ Feldspar |
|---|---|---|---|---|---|---|---|---|---|---|---|---|
| Quartz (flint) | 31.3% | 35.9% | 15.2% | 22.6% | 8.5% | 0% | 0% | 22.3% | 5.7% | 0% | 0% | 19.9% |
| Kaolin Clay | 28.1% | 32.3% | 32.0% | 23.0% | 28.2% | 26.4% | 0% | 22.7% | 26.0% | 26.0% | 0% | 0% |
| BD Lime | 3.4% | 4.3% | 3.9% | 3.3% | 3.8% | 3.7% | 4.3% | 2.8% | 3.1% | 3.1% | 4.3% | 4.4% |
| Borax | 4.7% | 5.2% | 5.2% | 0% | 1.5% | 0% | 0% | 0% | 0% | 0% | 1.1% | 1.1% |
| Boric Acid | 3.2% | 3.9% | 3.6% | 7.3% | 6.9% | 8.2% | 8.6% | 7.3% | 8.2% | 8.2% | 7.7% | 7.8% |
| Salt Cake | 0.2% | 0.2% | 0.2% | 0.2% | 0.2% | 0.2% | 0.2% | 0.2% | 0.2% | 0.2% | 0.2% | 0.2% |
| Limestone | 29.1% | 0% | 0% | 28.7% | 0% | 0% | 0% | 27.9% | 0% | 0% | 0% | 0% |
| Quicklime | 0% | 18.3% | 0% | 0% | 0% | 0% | 0% | 0% | 0% | 0% | 0% | 0% |
| Calcium Silicate | 0% | 0% | 39.9% | 0% | 39.1% | 39.0% | 27.0% | 0% | 37.9% | 37.9% | 26.5% | 26.6% |
| Volcanic Glass | 0% | 0% | 0% | 14.9% | 11.8% | 17.0% | 4.2% | 14.7% | 16.8% | 16.8% | 0% | 0% |
| Diatomaceous Earth (DE) | | | | | | 5.5% | 17.4% | 0% | 0% | 5.7% | 20.0% | 0% |
| Plagioclase Feldspar | | | | | | 0% | 38.3% | 0% | 0% | 0% | 40.1% | 40.1% |
| Slag | | | | | | 0% | 0% | 2.0% | 2.0% | 2.0% | 0% | 0% |
| Total | 100% | 100% | 100% | 100% | 100% | 100% | 100% | 100% | 100% | 100% | 100% | 100% |
| Volume of $CO_2$ @ 1400 C. | 1668 | 0 | 0 | 1647 | 0 | 0 | 0 | 1624 | 0 | 0 | 0 | 0 |

SCMs may also be fed by one or more roll stands, which in turn supports one or more rolls of glass mat, as described in Applicant's U.S. Pat. No. 8,650,914 issued Feb. 18, 2014, incorporated herein by reference. In certain embodiments powered nip rolls may include cutting knives or other cutting components to cut or chop the mat (or roving, in those embodiments processing roving) into smaller length pieces prior to entering the SCM. Also provided in certain embodiments may be a glass batch feeder. Glass batch feeders are well-known in this art and require no further explanation.

SCM dimensions and the number and arrangement of submerged combustion burners may vary, depending on feed composition and product to be produced. Fined glass may be produced, as well as foamed glass. The typical bubble (void)

diameter in melt samples may be about 0.1 mm, but with time at temperatures, as is provided by a refractory lined channel or forehearth of varying length and depth, the small bubbles may coalesce and form larger voids that rise in the flowing molten glass and may be removed from the bulk glass. With enough time and temperature, the glass becomes "fined" to the state of a solid glass without voids. If foamed glass is desired, insulating foam glass depends on a significant void fraction to produce a closed cell, light-weight glass that has insulating properties. Glass produced from an SCM of this disclosure may have a significant closed cell void fraction that could be used as an insulating glass panel. Some modifications, such as described in Applicant's U.S. Pat. No. 8,997,525 issued Apr. 7, 2015, may be needed to control void fraction to a higher fraction (percentage) and to increase the average size of the voids from the typical 0.1 mm diameter to 1 mm or more.

SCMs may experience excessive water condensation, which may collect in and saturate refractory and/or burner holders. Drain conduits and drain channels such as described in Applicant's International Application Number PCT/US13/43377, filed on May 30, 2013, may be used in retrofitting an existing SCM, or in constructing a new SCM in accordance with the present disclosure. Drain conduits and drain channels may have a wide variety of cross-sectional shapes, and the cross-sectional shape may be the same or different along the length (flow direction) of drain conduits and drain channels.

Those having ordinary skill in this art will appreciate that there are many possible variations of the melter, burners, and other components described herein, and will be able to devise alternatives and improvements to those embodiments described herein that are nevertheless considered to be within the claims of the present patent. Accordingly, all such modifications are intended to be included within the scope of this disclosure as defined in the following claims. In the claims, no clauses are intended to be in the means-plus-function format allowed by 35 U.S.C. § 112, paragraph 6 unless "means for" is explicitly recited together with an associated function. "Means for" clauses are intended to cover the structures described herein as performing the recited function and not only structural equivalents, but also equivalent structures.

What is claimed is:

1. A method of operating a submerged combustion melter for melting a glass-forming material, the method comprising:
   providing the submerged combustion melter comprising a melt chamber having an interior at least partially defined by a melt chamber floor, at least one melt chamber sidewall, and a melt chamber roof;
   disposing, in the interior of the melt chamber, the glass-forming material;
   disposing, in the melt chamber floor, a submerged combustion burner, wherein the submerged combustion burner comprises a multi-portion mixing chamber comprising a first portion and a second portion, wherein the second portion is at least partially defined by a first interior sidewall, a second interior sidewall disposed opposite the first interior sidewall, an outlet port, and a bottom interior wall disposed opposite the outlet port and spanning the first interior sidewall and the second interior sidewall, and wherein the outlet port is communicatively coupled to the interior of the melt chamber, and wherein the mixing chamber comprises a depth dimension from the bottom interior wall to the outlet port, and wherein the outlet port comprises a width dimension that is less than the depth dimension;
   introducing into the first portion of the multi-portion mixing chamber of the submerged combustion burner, from a fuel inlet, a fuel;
   introducing to the first portion of the multi-portion mixing chamber of the submerged combustion burner, from an oxidant inlet, an oxidant;
   mixing, in the first portion of the multi-portion mixing chamber, the fuel and the oxidant to form a fuel/oxidant mixture;
   discharging, into the second portion of the multi-portion mixing chamber, the fuel/oxidant mixture; and
   ejecting into the interior of the submerged combustion melter, from the outlet port, the fuel/oxidant mixture.

2. The method of claim 1, wherein the outlet port is at least partially defined by the first sidewall and the second interior sidewall.

3. The method of claim 2, wherein the outlet port ejects the fuel/oxidant mixture along a burner axis.

4. The method of claim 3, wherein the burner axis is disposed at an angle substantially orthogonal to the first portion of the multi-portion mixing chamber.

5. The method of claim 1, wherein the mixing chamber comprises an elongate mixing volume.

6. The method of claim 5, wherein the elongate mixing volume is at least partially defined by the first interior sidewall and the second interior sidewall.

7. The method of claim 6, wherein the elongate mixing volume is further defined by at least one baffle.

8. The method of claim 1, wherein introducing the fuel comprises introducing the fuel at a location offset from where the oxidant is introduced.

9. The method of claim 1, further comprising, substantially simultaneously with mixing the fuel and oxidant in the mixing chamber, introducing, into a cooling volume at least partially defined by the first interior sidewall, a cooling fluid via a cooling fluid inlet.

10. The method of claim 9, further comprising circulating, within the cooling volume, the cooling fluid.

11. The method of claim 10, wherein an uppermost portion of the cooling volume in which the cooling fluid is circulated is disposed proximate the outlet port.

12. The method of claim 9, wherein the fuel inlet comprises a plurality of fuel inlets and wherein the oxidant inlet comprises a plurality of oxidant outlets.

13. The method of claim 12, wherein the first portion of the multi-portion mixing chamber comprises a plurality of first portions.

14. The method of claim 13, wherein the plurality of first portions of the multi-portion mixing chamber discharge to a single second portion of the multi-portion mixing chamber.

15. A method of introducing a fuel/oxidant mixture with a submerged combustion burner to a lower section of an interior of a submerged combustion melter for melting a glass-forming material disposed in the lower section, the method comprising:
   providing the submerged combustion burner, wherein the submerged combustion burner comprises a multi-portion mixing chamber comprising a first portion and a second portion at least partially defined by a first interior sidewall, a second interior sidewall disposed opposite the first interior sidewall, an outlet port, and a bottom interior wall disposed opposite the outlet port and spanning the first interior sidewall and the second interior sidewall, wherein the outlet port is communicatively coupled to the lower section of the interior of the melt chamber, wherein the mixing chamber comprises a depth dimension from the bottom interior wall to the outlet port, wherein the outlet port comprises a width dimension from the first interior sidewall to the second interior sidewall, and wherein the outlet port width dimension is less than the mixing chamber depth dimension;

introducing a fuel from a fuel inlet to the first portion of the multi-portion mixing chamber of the submerged combustion burner, wherein the fuel inlet penetrates the first portion at a first distance below the outlet port;

introducing an oxidant from an oxidant inlet to the first portion of the multi-portion mixing chamber of the submerged combustion burner, wherein the oxidant inlet penetrates the first portion at a second distance below the outlet port;

mixing the fuel and the oxidant to form the fuel/oxidant mixture in the mixing chamber; and ejecting the fuel/oxidant mixture from the outlet port into the lower section of the interior of the submerged combustion melter.

16. The method of claim 15, wherein the fuel is introduced from the fuel inlet at a location offset from where the oxidant is introduced from the oxidant inlet.

17. The method of claim 15, wherein the first and second distance are less than the outlet port width dimension.

18. The method of claim 15, wherein the mixing chamber depth dimension is greater than at least one of the first distance and the second distance.

19. The method of claim 15, wherein the mixing chamber comprises an elongate mixing volume sufficient to effectively mix a substantial portion of the fuel and the oxidant to form the fuel/oxidant mixture.

20. The method of claim 15, wherein the elongate mixing volume is defined at least in part by the first interior sidewall and the second interior sidewall.

21. The method of claim 20, wherein the elongate mixing volume is defined at least in part by a plurality of baffles.

22. A submerged combustion melter system for melting a glass-forming material, the submerged combustion melter system comprising:

a melt chamber comprising:
  a floor defining at least one burner opening;
  at least one wall extending from the floor;
  a roof disposed above a top portion of the at least one wall, wherein the floor, the at least one wall, and the roof define a melt chamber interior;
  a material inlet for introducing the glass-forming material to the melt chamber interior; and
  a material outlet for removing the glass-forming material from the melt chamber interior; and a submerged combustion burner disposed in the at least one burner opening, the submerged combustion burner comprising:

a burner body comprising a multi-portion mixing chamber comprising a first portion and a second portion defined by a first interior sidewall, a second interior sidewall, a bottom interior wall spanning the first interior sidewall and the second interior sidewall, and an outlet port disposed opposite the bottom interior wall, wherein the outlet port is communicatively coupled to the melt chamber interior;

at least one cooling space at least partially defined by the first interior sidewall and the second interior sidewall;

a cooling fluid inlet conduit and a cooling fluid outlet conduit, wherein each of the cooling fluid inlet conduit and the cooling fluid outlet conduit are connected to the at least one cooling space;

at least one fuel inlet communicatively coupled to the first portion of the multi-portion mixing chamber, wherein the at least one fuel inlet penetrates the first portion of the multi-portion mixing chamber and is configured to introduce a fuel to the mixing chamber; and at least one oxidant inlet communicatively coupled to the first portion of the multi-portion mixing chamber, wherein the at least one oxidant inlet penetrates the first portion of the multi-portion mixing chamber and is configured to introduce an oxidant to the mixing chamber, wherein the mixing chamber is configured to effectively mix a substantial portion of the fuel and the oxidant to form a fuel/oxidant mixture prior to discharge of the fuel/oxidant mixture through the outlet port.

23. The submerged combustion melter system of claim 22, wherein the at least one cooling space at least partially defines the mixing chamber.

24. The submerged combustion melter system of claim 22, wherein the at least one cooling space at least partially defines the outlet port.

25. The submerged combustion melter system of claim 22, wherein the at least one fuel inlet is disposed at a first angle to the mixing chamber and wherein the at least one oxidant inlet is disposed at a different second angle to the mixing chamber.

26. The submerged combustion melter system of claim 22, wherein the at least one fuel inlet is disposed substantially parallel to a plane defined by the outlet port.

27. The submerged combustion melter system of claim 22, wherein the mixing chamber comprises a width dimension between the first interior sidewall and the second interior sidewall.

28. The submerged combustion melter system of claim 22, wherein the at least one fuel inlet and the at least one oxidant inlet are disposed substantially parallel to each other.

29. The submerged combustion melter system of claim 22, wherein the at least one fuel inlet is staggered relative to the at least one oxidant inlet.

* * * * *